US012440990B2

(12) United States Patent
Brown et al.

(10) Patent No.: US 12,440,990 B2
(45) Date of Patent: Oct. 14, 2025

(54) ROBOTIC SYSTEM AND/OR METHOD

(71) Applicant: Chef Robotics, Inc., San Francisco, CA (US)

(72) Inventors: Kody Brown, San Francisco, CA (US); Weston Wahl, San Francisco, CA (US); Xinyi Daniel Tang, San Francisco, CA (US); Joseph Hartnagle, San Francisco, CA (US); Rajat Bhageria, San Francisco, CA (US); Clement Creusot, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 171 days.

(21) Appl. No.: 18/209,975

(22) Filed: Jun. 14, 2023

(65) Prior Publication Data

US 2023/0398689 A1 Dec. 14, 2023

Related U.S. Application Data

(60) Provisional application No. 63/351,983, filed on Jun. 14, 2022.

(51) Int. Cl.
*B25J 9/00* (2006.01)
*B25J 9/16* (2006.01)

(52) U.S. Cl.
CPC ........... *B25J 9/1674* (2013.01); *B25J 9/0093* (2013.01)

(58) Field of Classification Search
CPC .... B25J 9/1674; B25J 9/0093; B25J 11/0045; B25J 9/1679; B25J 21/00; B25J 11/005;

(Continued)

(56) References Cited

U.S. PATENT DOCUMENTS 4,922,435 A 5/1990 Cahlander et al.
8,276,505 B2 10/2012 Buehler
(Continued)

FOREIGN PATENT DOCUMENTS

JP 2019025646 A 2/2019
WO 2011152520 A1 12/2011
(Continued)

OTHER PUBLICATIONS

Brown, Kody, et al., "System and/or Method for Refilling Assembly Systems", U.S. Appl. No. 18/114,892, filed Feb. 27, 2023.

*Primary Examiner* — B M M Hannan
(74) *Attorney, Agent, or Firm* — Jeffrey Schox; Evan Myers

(57) ABSTRACT

The system 100 can include a robotic assembly system 110 and a set of barriers 120. The robotic assembly system can include a robot arm, a frame, an optional utensil, an optional bin, and/or any other suitable components. However, the system 100 can additionally or alternatively include any other suitable set of components. The system 100 functions to facilitate robotic assembly of items/ingredients (e.g., in an assembly line environment). Additionally or alternatively, the system 100 can function to guard robotic assembly components during operation. Additionally or alternatively, the system 100 can function to mitigate the influence of a robotic assembly system on surrounding workers (e.g., in an assembly line environment).

14 Claims, 18 Drawing Sheets

(58) Field of Classification Search
CPC .................. B25J 11/008; B25J 9/0096; G05B 2219/40202
USPC ........................................................ 700/255
See application file for complete search history.

(56) References Cited

U.S. PATENT DOCUMENTS

| | | | |
|---|---|---|---|
| 9,815,191 | B2 | 11/2017 | Oleynik |
| 9,895,018 | B2 | 2/2018 | Lin |
| 10,518,409 | B2 | 12/2019 | Oleynik |
| 11,577,401 | B2 | 2/2023 | Sinnet et al. |
| 11,696,661 | B2 | 7/2023 | Itano et al. |
| 11,744,403 | B2 | 9/2023 | Sinnet et al. |
| 11,745,348 | B2 | 9/2023 | Bhageria et al. |
| 2004/0172380 | A1 | 9/2004 | Zhang et al. |
| 2013/0101714 | A1 | 4/2013 | Buehler |
| 2016/0059412 | A1 | 3/2016 | Oleynik |
| 2017/0290345 | A1 | 10/2017 | Garden et al. |
| 2017/0348854 | A1 | 12/2017 | Oleynik |
| 2018/0050451 | A1 | 2/2018 | Takanishi et al. |
| 2018/0250810 | A1 | 9/2018 | Sirkett et al. |
| 2020/0054175 | A1 | 2/2020 | Roy et al. |
| 2020/0086485 | A1 | 3/2020 | Johnson et al. |
| 2020/0086509 | A1 | 3/2020 | Johnson et al. |
| 2020/0139554 | A1 | 5/2020 | Sinnet et al. |
| 2020/0286192 | A1 | 9/2020 | Roy et al. |
| 2020/0394603 | A1 | 12/2020 | Ottitsch et al. |
| 2021/0022559 | A1 | 1/2021 | Zito et al. |
| 2021/0032034 | A1* | 2/2021 | Kalouche ............... B25J 9/1612 |
| 2021/0069904 | A1 | 3/2021 | Duan et al. |
| 2021/0069910 | A1* | 3/2021 | Oleynik ................ F25D 23/028 |
| 2021/0171283 | A1 | 6/2021 | Deacon et al. |
| 2021/0187741 | A1 | 6/2021 | Marthi et al. |
| 2021/0387350 | A1* | 12/2021 | Oleynik .................. A47J 44/00 |
| 2022/0016758 | A1 | 1/2022 | Whitiker |
| 2022/0048707 | A1 | 2/2022 | Matl et al. |
| 2022/0072707 | A1 | 3/2022 | Fan |
| 2022/0177241 | A1 | 6/2022 | Brinkmeyer et al. |
| 2022/0346598 | A1* | 11/2022 | Sinnet ................ A47J 37/1228 |
| 2022/0371833 | A1 | 11/2022 | Ikemoto |
| 2022/0410381 | A1 | 12/2022 | Stoppi et al. |
| 2023/0027984 | A1 | 1/2023 | Rodrigues |
| 2023/0083652 | A1 | 3/2023 | Bhageria et al. |
| 2023/0278229 | A1 | 9/2023 | Brown et al. |
| 2023/0294295 | A1 | 9/2023 | Creusot et al. |
| 2023/0304847 | A1 | 9/2023 | Tsukamoto et al. |
| 2023/0398689 | A1 | 12/2023 | Brown et al. |

FOREIGN PATENT DOCUMENTS

| | | |
|---|---|---|
| WO | 2020188262 A1 | 9/2020 |
| WO | 2020261601 A1 | 12/2020 |
| WO | 2021044053 A1 | 3/2021 |

* cited by examiner

ROBOTIC SYSTEM AND/OR METHOD

CROSS REFERENCE TO RELATED APPLICATIONS

This application claims the benefit of U.S. Provisional Application No. 63/351,983, filed 14 Jun. 2022, which is incorporated herein in its entirety by this reference.

TECHNICAL FIELD

This invention relates generally to the robotics field, and more specifically to a new and useful robotic system and/or method in the robotics field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
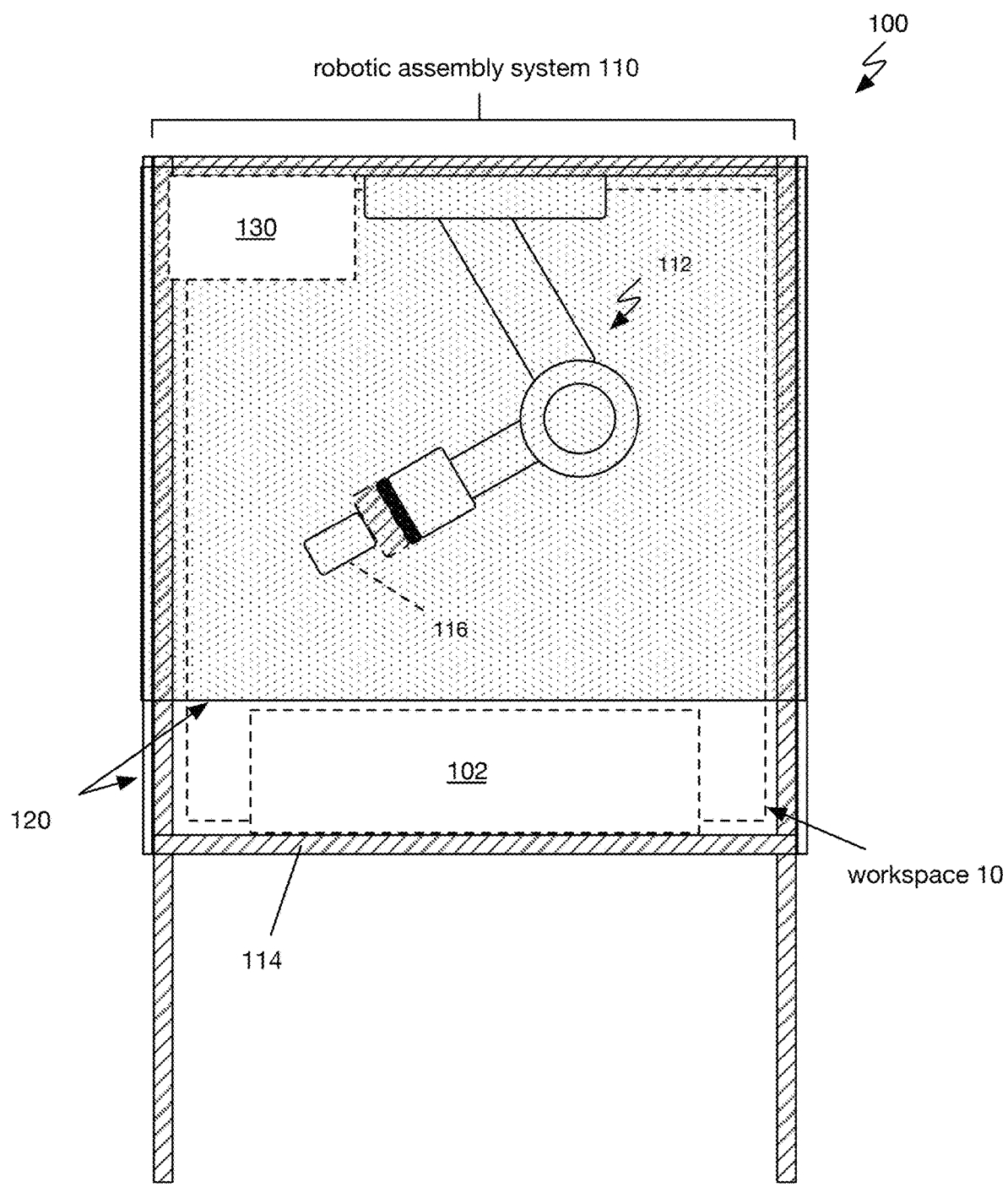
FIG. 1 is a schematic representation of a variant of the system.

The system 100, an example of which is shown in FIG. 1, can include a robotic assembly system 110 and a set of barriers 120. The robotic assembly system can include a robot arm 112, a frame 114, an optional utensil 116, an optional bin 102, and/or any other suitable components. The system 100 and/or (robotic assembly system 11o) can optionally include or be used with a human machine interface 130. However, the system 100 can additionally or alternatively include any other suitable set of components. The system 100 functions to facilitate robotic assembly of items/ingredients (e.g., in an assembly line environment). Additionally or alternatively, the system 100 can function to guard robotic assembly components during operation. Additionally or alternatively, the system 100 can function to mitigate the influence of a robotic assembly system on surrounding workers (e.g., in an assembly line environment).

In a specific example of the system 100, a robotic assembly system 110 and a human worker may operate on opposing sides of a conveyor line, adding foodstuff ingredients into opposite rows of containers (e.g., two rows of containers traversing together on a conveyor line). The set of barriers 120 of the system can guard against unintended and/or unintentional ingress by the human worker into the workspace 10 of the robotic assembly system, which may reduce the risk of ingredient bumps/spills, mechanical damage, and/or human entanglement in the system components. Additionally, the system may avoid unduly blocking/constraining the human, by allowing facile access to the containers on the human worker's side of the conveyor line.

In variants, the system can provide guarding and/or otherwise operate in conjunction with the system(s) and/or method(s) described in any one or more of: U.S. application Ser. No. 17/881,475, filed 4 Aug. 2022, titled "SYSTEM AND/OR METHOD FOR ROBOTIC FOODSTUFF ASSEMBLY," U.S. application Ser. No. 18/114,892, filed 27 Feb. 2023, titled "SYSTEM AND/OR METHOD FOR REFILLING ASSEMBLY SYSTEMS," and/or U.S. application Ser. No. 18/124,451, filed 21 Mar. 2023, titled "INTERFACE SYSTEM AND/OR METHOD FOR REFILLING ASSEMBLY SYSTEMS," each of which is incorporated herein in its entirety by this reference.

The term "substantially" as utilized herein can mean: exactly, approximately, within a predetermined threshold or tolerance, and/or have any other suitable meaning.

The term "close-out" as utilized herein can refer to a barrier element, shielding, panel, shim, or other body which fills (a.k.a., 'closes') a gap/space between two components (e.g., closes a finger gap, reducing a maximum dimension of a gap to less than a predetermined threshold—such as a finger gap size, etc.). For example, a close-out can refer to a component which fills a space/gap in an enclosure (or a partial enclosure) and/or forms a part of the enclosure (or partial enclosure). In a second example, a close-out in the context of the workspace can reduce the exterior exposure of the workspace (e.g., along a gap between the frame and/or barriers). Alternatively, the term close-out can be a panel, cover, substantially rigid gap-filler, and/or can be otherwise suitably referenced.

The term "task space" as utilized herein preferably refers to a mathematical set of effector and/or food utensil poses (e.g., available in a particular arrangement), but can be otherwise suitably used or referenced. The term "workspace" preferably refers to a physical volume associated with all reachable/available poses (e.g., points) for the system and/or robot arm thereof. For example, the workspace of a robot arm can be defined entirely based on the geometry of joints and/or intrinsic kinematic constraints of the arm (e.g., a manufacturer specification, etc.). Similarly, the workspace 10 of a foodstuff assembly system which includes a robot arm can be further restricted by constraints imposed by other system components (e.g., frame geometry, joint boundaries imposed by control software, collision constraints, etc.). Accordingly, the restricted workspace of the foodstuff assembly system can refer to the physical volume in which the robot operates based on the (effective) task space of the robot in a particular configuration. Additionally or alternatively, the workspace 10 can refer to the workspace of the robot arm as constrained by a controller thereof.

1.1 Illustrative Examples

In a first set of variants, a robotic assembly system configured to facilitate ingredient placement at a placement region along a conveyor line, the robotic assembly system includes: a frame configured to support a set of ingredient bins at a first height; a human machine interface (HMI) including a display mounted to the frame at a first end opposite the conveyor line along a longitudinal axis of the frame; a collaborative robot arm with a base, the base mounted to the frame at the first end and at a second height above the first height, the collaborative robot arm defining a workspace; and a set of barriers including: a left barrier and a right barrier on opposite sides of a midsagittal plane, the left barrier and the right barrier each coupled to the frame with a set of lift-off hinges and substantially spanning between: the first height and the second height; and the first end and the conveyor line, wherein the workspace is at least partially unenclosed below the HMI at the first end, between the left and right barriers.

In a second set of variants, nonexclusive with the first, a robotic assembly system configured to facilitate ingredient placement at a placement region along a conveyor line includes: a frame configured to position a set of bins at a first height; a collaborative robot arm comprising a base, the base mounted to the frame at a first end and at a second height above the first height; a controller coupled to the collaborative robot arm configured to control the collaborative robot arm within a system workspace, wherein the system workspace is a subset of a workspace of the collaborative robot arm and is at least partially constrained based on a geometry of the frame and the bin positions; and a set of machine guards mounted to the frame and configured to selectively guard a first portion of an exposed boundary of the system workspace, wherein a remainder of the exposed boundary of the system workspace is unguarded, the remainder comprising a first region of the exposed boundary adjacent to the first end and between the first height and the second height. In one variant, the set of machine guards includes physical barriers and/or opto-electronic barriers. In one variant, a set of interlocks is configured to detect an interrupt of at least one of the machine guards and, in response, trigger a halt of the collaborative robot arm. In an example, the controller is configured to remain in a single operational mode during machine guard interrupts. In one variant, an area of the first region is larger than a frontal area of a bin of the set. In one variant, the first region is configured to facilitate bin transitions across the exposed boundary contemporaneously with operation of the collaborative robot arm. In one variant, the remainder of the exposed boundary comprises a superior (e.g., upward-oriented surface) region of the exposed boundary, wherein at least one joint of the collaborative robot arm is configured to transform above a maximum height of the frame and the set of machine guards.

2. Benefits

Variations of the technology can afford several benefits and/or advantages.

First, variations of this technology can facilitate cooperation between robots and human workers in a foodstuff assembly context (e.g., such as when humans collaborate the foodstuff assembly system along an assembly line). Such variants can de-risk interactions between humans and robots by reducing or eliminating opportunities for humans (or human body parts) to incidentally contact moving machinery (e.g., bumping, jostling, etc.). In some such variants and/or circumstances, it maybe beneficial to guard against unintended interactions between a human and a collaborative robot, even in cases where such interactions may not themselves present a direct safety risk. For example, in variants where a robot arm and/or robot assembly system may be power and/or force limited to avoid direct bodily harm during collaborative interactions, the barriers of the system may further avoid/reduce low-risk accidents (e.g., spilling ingredients or dropping tools due to human-robot interactions, unsuccessful picks resulting from ingredients deposition above a target pick location, etc.) which may occur as a result of undesirable human-machine contact and may be cumbersome for workers performing tasks around the robot, particularly in a high throughput setting (e.g., where frequently losing seconds due to such incidents may greatly hinder production). In some variants, such guarding may minimally influence a physical "footprint" of the system (e.g., with no increase to the footprint in a longitudinal, lateral, and/or vertical direction; minimal increase to the footprint in one or more dimensions, etc.).

Second, variants can improve consistency by responding to incidental ingress of the machine (e.g., by a user) to reduce inconsistencies in ingredient pick amount (e.g., with minimal reduction in throughput). For example, in some cases users may add or replenish ingredients from the side(s) of the system (e.g., which may be guarded or blocked by a barrier under nominal conditions), which may modify the surface profile of foodstuff. and result in inaccurate pick depth for a pick(s). In such variants, barrier interlocks may trigger 'soft-stops' of the robot arm, which may reduce the risk of collisions (e.g., which may otherwise greatly impact throughput efficiency) and/or inaccurate picks. For example, if a user breaks or disables a barrier (e.g., removing a physical barrier; crossing a break-beam/light-curtain, etc.) in the process of entering the workspace (e.g., to loosen packed ingredients, add ingredients, brush-off the food utensil, etc.) the robot arm may enter a temporarily hold until the interlock is re-engaged (e.g., barrier return to a default configuration; etc.). However, variants can otherwise improve consistency and/or facilitate any other suitable responses to machine ingress.

Third, variations of this technology can allow the system to be flexibly reconfigured to adapt to a variety of food assembly applications. For example, variants can allow the system to be reconfigured for various positions along an assembly line and/or accommodate variance in assembly line geometry/shape (e.g., arcuate, warped, parabolic, saddle-shaped, anticline/syncline shaped, etc.), variance in container geometry (e.g., height/width), and/or sloped factory floors. Additionally, variants can allow the system to be easily moved away from an operating arrangement along an assembly line (e.g., for cleaning, etc.) and subsequently returned to an operating arrangement (e.g., at the same or a different position along the assembly line). Additionally, variants can facilitate streamlined reconfiguration of robot tools, replacement of ingredients, and/or removal of components (e.g., for cleaning/servicing). However, variants can otherwise facilitate flexible system configuration and/or reconfiguration.

Fourth, variations of this technology can reduce the footprint (e.g., width, parallel to a direction of conveyor motion, vertical projection area, etc.) of robotic assembly systems and barriers associated therewith along a conveyor line. For example, throughput scalability along a conveyor line maybe evaluated as a function of throughput per unit width, which may be the driving constraint for the number of assembly operations that may be completed by humans and/or machines for a particular assembly line (of finite length) at a particular conveyor speed. Similarly, variations can reduce the total area footprint of a robotic assembly by utilizing a collaborative robot in conjunction with partial barriers, flexible barriers, insubstantial barriers (e.g., optoelectronic), and/or adjustable barriers; which can reduce the additional area footprint dedicated to barrier/guarding protections and/or the reduce impact on surrounding human operations within a production facility.

However, variations of the technology can additionally or alternately provide any other suitable benefits and/or advantages.

3. System

The system 100, an example of which is shown in FIG. 1, can include a robotic assembly system no and a set of barriers 120. The robotic assembly system can include a robot arm, a frame, an optional utensil, an optional bin, and/or any other suitable components. However, the system 100 can additionally or alternatively include any other suitable set of components. The system 100 functions to facilitate robotic assembly of items/ingredients (e.g., in an assembly line environment). Additionally or alternatively, the system 100 can function to guard robotic assembly components during operation. Additionally or alternatively, the system 100 can function to mitigate the influence of a robotic assembly system on surrounding workers (e.g., in an assembly line environment).

3.1 Robotic Assembly System

The robotic assembly system functions to manipulate items/ingredients and/or functions to enable transferal of items/ingredients from a bin into a container (such as a bowl, tray, or other foodstuff receptacle; on a conveyor line). The robotic assembly system can include a robot arm, a frame, an optional utensil, an optional bin, an optional human machine interface (HMI), an optional refill table, and/or any other suitable components. However, the robotic assembly system can additionally or alternatively include any other suitable set of components. In a specific example, the robotic assembly system can be a foodstuff assembly system as described in U.S. application Ser. No. 17/881,475, filed 4 Aug. 2022, titled "SYSTEM AND/OR METHOD FOR ROBOTIC FOODSTUFF ASSEMBLY," which is incorporated herein in its entirety by this reference.

The robotic assembly system preferably defines a workspace (e.g., an example is shown in FIG. 2; surrounded and/or partially/fully enclosed by the set of barriers), which can be occupied by the robot arm and/or utensil during robotic transformation. Accordingly, the workspace preferably extends within an interior of the bin (e.g., to facilitate item/ingredient picking within the bin) and can additionally extend within an interior of a container along a conveyor line (or a volume above the container). In variants, the workspace can extend above the frame and/or a barrier mounted thereto (e.g., allowing the robot arm and/or utensil to occupy a space above the frame). For example, at least one joint of the robot arm can be configured to transform above the set of barriers. However, the robotic assembly system can define any other suitable workspace.

In variants, the robotic assembly system is preferably a collaborative robot (a.k.a., "cobot") system (along individual components thereof, such as the robotic arm and/or the optional utensil). In an example, the robotic assembly system and/or a robotic arm thereof can be certified under and/or compliant with collaborative ISO safety standards. For example, the system, robot arm, food utensil, and/or controller thereof can be configured to comply with the collaborative requirements of ISO 10218-1 and ISO 10218-2 safety standards (e.g., ISO 10218-1, ISO/TS 15066:2016, ISO 10218-2:2011, ISO/TS 15066, etc.; in a food assembly setting).

The robot arm functions to position and/or articulate a utensil to manipulate items or ingredients within the bin(s). More specifically, the robot arm can articulate a food utensil to pick ingredients from a foodstuff bin and/or transfer foodstuff ingredients from the bin into containers (e.g., bowls, microwave trays, etc.) on a conveyor line. The robot arm can be articulated by automatic control and/or can be configured to automatically execute control instructions (e.g., from a controller), however the system can alternatively be otherwise suitably controlled and/or otherwise suitably enable food utensil articulation. The robot arm can include any suitable number of joints which enable articulation of the utensil (or another end effector) in a single degree of freedom (DOF). The arm preferably includes 6 joints (e.g., a 6-axis robot arm), but can additionally or alternatively include three joints, seven joints, more than seven joints, and/or any other suitable number of joints.

The robot arm is preferably mounted to the frame at a position above a top plane of the food containers and/or above the bin, which can enable the arm to be return to a pose which is offset from the food containers and/or foodstuff bin (i.e., allowing a user to access foodstuff with minimal restrictions). More preferably, a base joint of robot arm is mounted to an upper portion of the frame and oriented towards the foodstuff bin (e.g., directed vertically downward; joint axis defines an angle of 30 degrees, 45 degrees, 60 degrees, 90 degrees, and/or any subrange bounded therein relative to a gravity vector). However, the robot arm can be top-mounted, side-mounted, mounted on an incline (e.g., 45 degree base angle), base-mounted (e.g., with a base joint directed upwards), and/or otherwise suitably mounted.

The robot arm is preferably a collaborative robot arm (e.g., in certified compliance with collaborative ISO safety standards, etc.), but can alternatively be an industrial robot and/or any other suitable robot arm.

In variants, the robot arm can be operated by a controller, coupled to the robot arm configured to control the collaborative robot arm within the system workspace, wherein the system workspace is a subset of a workspace of the collaborative robot arm and is at least partially constrained based on a geometry of the frame and the bin positions. For example, the controller can be a controller as described in any one of U.S. application Ser. No. 17/881,475, filed 4 Aug. 2022, U.S. application Ser. No. 18/075,961, filed 6 Dec. 2022, and/or any other suitable controller.

However, the system can include any other suitable robotic arm.

The frame functions to structurally support the robot arm. Additionally or alternatively, the frame can function to structurally support the set of barriers. The frame can additionally function to position the bin relative to the robot arm. The frame can additionally or alternatively function as a food assembly workstation for a human (e.g., kitchen and/or line worker). The frame can be sized to conform to the physical constraints of a kitchen or industry line environment, such as defining a width less than a predetermined threshold dimension (e.g., width of standard doorway, width of a standard worksurface; 24 inches, 36 inches, etc.), area less than a predetermined threshold area (e.g., half of a standard worksurface table area, 24 inches×36 inches, etc.), and/or a height within a predetermined threshold (e.g., foodstuff bin height within a range of standard worksurface heights; full height less than door frame height, etc.; max height less than height of standard door frame). The frame is preferably self-supporting (e.g., free-standing), but can alternatively be selectively fixed in place (e.g., mounted to the floor, clamped to conveyor, etc.), and/or otherwise configured. The frame can be unitary or modular. In variants, multiple modules of the foodstuff assembly system can be rigidly connected and/or aligned to one another with various mounting hardware. Alternatively, the system can be mechanically isolated and/or physically separate from other modules (e.g., in an industrial line setting), and/or can be otherwise suitably configured. The frame is preferably constructed of a food safe material (e.g., a stainless steel weldment; wipe-down/washdown material) and/or includes a food safe coating or other suitable protective coating (e.g., food safe powder coat, food safe anodized coating, unfinished stainless steel, etc.). In a specific example, the frame can be constructed from T-slot (e.g., 80/20) or other reconfigurable framing materials. In variants where the frame is free-standing, the frame can include any suitable stiffening and/or damping elements to mitigate vibrations resulting during actuation of the robot arm. However, the frame can be otherwise constructed.

The frame can be static, movable (e.g., rolling frame; wheeled; etc.), leveled (e.g., via leveling feet), and/or can be otherwise arranged.

However, the system can include any other suitable frame.

The robotic assembly system can optionally include or operate in conjunction with one or more bins which function to retain items/ingredients for assembly (e.g., to fill an order or a predetermined configuration). Bins can include: hotel pans, food trays, National Sanitation Foundation (NSF) certified food safe containers, and/or other suitable bins/containers. There can be a single bin (e.g., single hotel pan) or multiple bins (e.g., in an array or grid). Bins can be identical or vary in size/shape according to the corresponding ingredient housed therein. The bins can be removable and/or interchangeable (e.g., for cleaning and/or ingredient servicing), however the bins can alternatively be fixed relative to the frame and/or serviced in-situ (e.g., adding ingredients and/or cleaning in place). Preferably, the foodstuff containers are arranged and/or aligned in a predetermined configuration (e.g., known positions within an imaging coordinate frame), but can otherwise be reconfigurable and/or customizable (e.g., configured differently to fill different types of order at different times, etc.). The bins are preferably arranged within the frame within a bin region, defining a bin region with deterministic bounds (e.g., laterally, vertically, etc.) within the system workspace. A top plane of the foodstuff bins is preferably at a standard worksurface height (e.g., allowing a user to act in place of the robot arm, for a standing human, for a seated human, etc.; 3 ft, 4 ft, etc. and/or substantially at a worksurface height, such as within a predetermined range; etc.), however a bottom plane of the foodstuff bins can alternatively be at a standard worksurface height, the bins can (vertically) span a standard worksurface height, and/or the bins can be otherwise positioned at any other suitable height. However, the robotic assembly system can include or be used with any other suitable bin(s). Alternatively, bins can be removed (e.g., for cleaning) or omitted entirely in some variants (e.g., where ingredient/item retention may be integrated into the frame or may be external to the system, etc.).

The foodstuff assembly system is preferably configured to simultaneously support at least two foodstuff bins (e.g., in the same/different configurations) which may allow one to foodstuff bin to be refilled while the robot picks from the remaining foodstuff bin, thereby facilitating substantially continuous operation (e.g., without requiring a pause to refill an empty bin) and/or robot picks contemporaneously occurring during refills. As an example, the foodstuff assembly module can be configured to pick (e.g., with a collaborative robot arm) foodstuff ingredients from a first foodstuff bin of the plurality contemporaneously with an operator manually transitioning a second foodstuff bin of the plurality between the pick region and the refill region. However, the system can be configured to operate with a single foodstuff bin, a plurality of foodstuff bins (e.g., exactly two, more than two, etc.), and/or any other suitable number of foodstuff bins.

For example, foodstuff bins can be removably arranged within the robotic assembly system (and/or within a restricted workspace of the robot arm), with each foodstuff bin independently supported by the frame.

In a second example, the foodstuff bins can be positioned within the robotic foodstuff assembly module by a refill table (e.g., integrated into the structure of the frame and/or removably attached to the frame), such as by the system and/or method(s) as described in U.S. application Ser. No. 18/114,892, filed 27 Feb. 2023, titled "SYSTEM AND/OR METHOD FOR REFILLING ASSEMBLY SYSTEMS," which is incorporated herein in its entirety by this reference. In a second However, the system can include any other suitable set of foodstuff bins. Alternatively, the system can altogether exclude foodstuff bins (e.g., in one or more configurations, such as during cleaning) and/or can be otherwise suitably configured.

The robotic assembly system can optionally include a utensil which functions to pick items/ingredients from within the bin and/or facilitate transferal of items/ingredients into a container (e.g., on a conveyor line). The food utensil can be impactive, ingressive, astrictive, contigutive, and/or any other suitable type of utensil/end effector. Food utensils can be directly actuated (e.g., the food utensil can include an integrated actuator which connects to the robot arm) or indirectly via a mechanical interface (e.g., food utensils may be articulated by a mechanical transformation of a utensil interface at the distal end of the robot arm). Accordingly, the utensil can be driven by any suitable actuators mounted to the robot arm or integrated therewith. Utensils can be actuated: electrically (e.g., servo or motor actuation), pneumatically, hydraulically, unactuated (e.g., passive deformation based on motion of robot, rigid body, etc.), and/or otherwise actuated. In variants, utensils can be manually interchangeable, manually reconfigurable, and/or manually removable. In a first example, a utensil can be manually removable to allow cleaning. In a second example, multiple utensils can be interchangeably used to accommodate different items/ingredients and/or pick amounts. In a third example, the food utensil can be a food utensil as described in U.S. application Ser. No. 17/965,202, filed 13 Oct. 2022, titled "ROBOTIC END EFFECTOR SYSTEM AND/OR METHOD," which is incorporated herein in its entirety by this reference. However, the arm can otherwise operate with any other suitable utensil(s) and/or other end effector(s).

In variants, the food utensil can be mounted at a distal end of the robot arm, the food utensil configured to facilitate insertion of bulk foodstuff ingredients. The food utensil can be selectively removable for washdown of the frame (e.g., along with removable barriers, bins, etc.).

In variants, the food utensils (and/or barriers) can be removable, by toolless operation (e.g., for washdown of the frame).

The foodstuff assembly system can optionally include or be used with a human machine interface (HMI) which can function to provide feedback to users to facilitate operation of the system and/or timely ingredient refills. Additionally, human machine interface (HMI) can function to receive human inputs which can be used by the computing system to determine foodstuff assembly instructions and/or control instructions for the foodstuff assembly system (e.g., configuring the machine).

In a specific example, the HMI is preferably mounted to the frame of the foodstuff assembly module and arranged distal to a conveyor (or conveyor region) of the system. For example, the HMI can be mounted opposite the base of a robotic arm (e.g., opposing the robotic arm across a thickness of a frame member; where the robotic arm is side-mounted at a rear end of the foodstuff assembly system, with the rear end opposite to the conveyor, etc.). However, the HMI can be otherwise arranged relative to the system and/or can be altogether excluded in some variants.

In variants, the HMI can be height adjustable relative to the frame (e.g., where the frame is freestanding), which may facilitate height adjustment to accommodate a range of users, floor inclination (e.g., where floors may be slanted/inclined to facilitate drainage), and/or otherwise adjustable relative to the frame.

In variants, the HMI can include an emergency stop (or 'disable' button). In an example, an emergency stop can be provided proximal to a refill table (e.g., on a rear side, distal to a conveyor) and/or proximal to a conveyor side and/or conveyor region (e.g., which may allow a user on an opposing side of the conveyor to disable the system). Additionally or alternatively, the HMI can include any other suitable physical, software, and/or other user protections or emergency system, and/or can be otherwise implemented.

However, the system and/or method can include or operate with any other suitable HMI(s).

However, the system 100 can include or be used with any other suitable robotic assembly system.

3.2 Barriers

The barriers function to guard against (e.g., reduce, eliminate, etc.) incidental/undesired human contact of components of the robotic assembly system and/or to limit human ingress into the workspace (e.g., in one or more configurations of the system). Barriers can be integrated into the physical structure of the foodstuff assembly system and/or mounted to the frame thereof, and/or can be separate (e.g., removable barriers, external barriers, etc.).

Figure 17A:
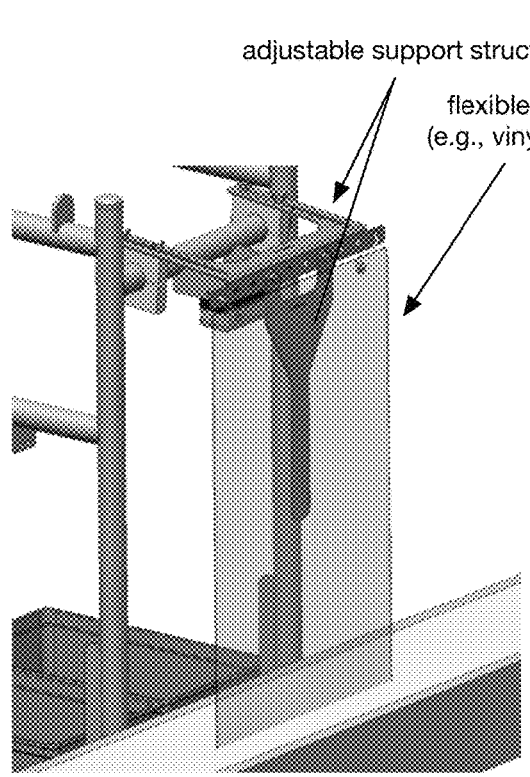
FIG. 17A-17B are a first and second 3D representation illustrating a variant of flexible shroud.
Figure 17B:
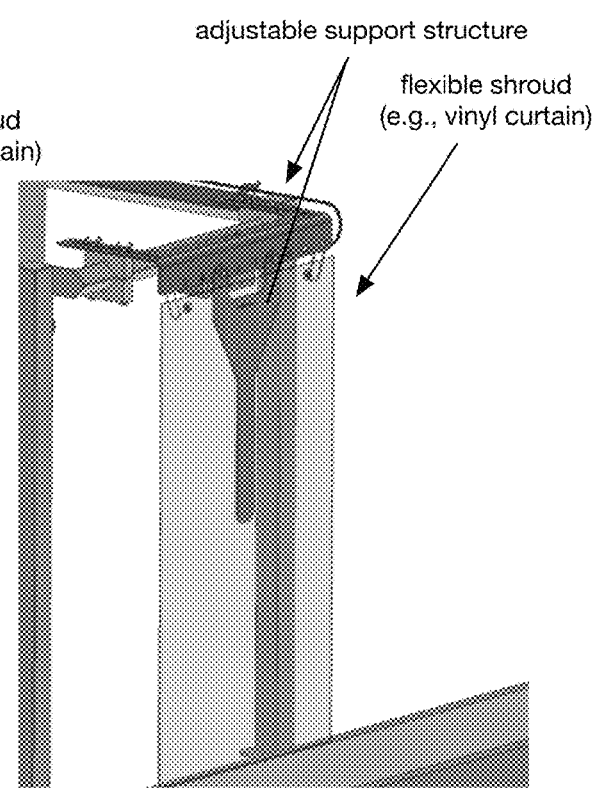

The set of barriers are preferably substantially rigid and/or substantially non-deformable (e.g., less than 1 mm deformation under nominal load case, such as 100 lbf applied to the exterior surface, etc.), but can additionally or alternatively be deformable (e.g., include collapsible portions to mitigate shock loads, etc.), flexible (e.g., shroud curtains, flexible barriers, etc.; examples are shown in FIGS. 17A and 17B), opto-electronic (e.g., light-curtain barrier, break-beam barrier, etc.), perception/software defined (e.g., computer vision-based hand detection, etc.), insubstantial (e.g., open top, open face, etc.) and/or otherwise implemented. The barriers are preferably formed with metal (e.g., stainless steel), but can additionally or alternatively include composites, polymer components (e.g., rubber guards, vinyl, etc.), rigid materials (e.g., substantially rigid, semi-rigid), flexible materials (e.g., vinyl, rubber, etc.), and/or any other suitable materials. The barriers are preferably formed with food safe materials (e.g., a stainless-steel assembly/weldment; wipe-down/washdown material; polypropylene; etc.), scratch-resistant materials (e.g., scratchable materials, materials that resist/prevent scratching during cleaning, etc.; for example in some implementations the barriers can exclude polycarbonate, Lexan, and/or abrasion resistant polycarbonate in food applications where such materials may harbor bacteria if scratched), and/or include a food safe coating or other suitable protective coating (e.g., food safe powder coat, food safe anodized coating, unfinished stainless steel, etc.). The barriers can be formed with the same material(s) as the frame and/or can include different materials. The set of barriers preferably form an assembly (e.g., with multiple bodies; in one or more configurations), but can alternatively be unitary (e.g., a single body, single weldment, etc.), or can be otherwise implemented.

In variants, the barriers can be perforated and/or can include a hole pattern, which may (partial) visibility through the barrier(s) which can allow human operators to observe various robot parameters/characteristics (e.g., robot state, amount of ingredient remaining, type of utensil, state of cleanliness, etc.) and/or can be beneficial to minimize the impact on workers within the environment (e.g., allow workers to observe each other through the machine, etc.). Perforations can be of any suitable size or geometry, but preferably include holes or slots with a smallest dimension of 6 millimeters or less (a.k.a., gap size of 6 millimeters or less), which can be beneficial to inhibit finger ingress. For example, the barriers can be formed with laser-cut sheet metal, punched sheet metal, a welded wireframe, or otherwise formed/fabricated.

The barrier(s) can be fixedly mounted to the frame of the robotic assembly and/or forcibly retained in place (e.g., in an operational configuration), such as using mechanical fasteners (e.g., thumb screws, latches, machine screws, etc.; manual fasteners, fasteners requiring tool assembly such as Torx head fasteners, etc.). Additionally, barriers can be removable (e.g., manually removable, selectively removable in one or more configurations; removable by a toolless operation), adjustable, non-adjustable (e.g., fixed position relative to the frame and/or bin position), reconfigurable, and/or can be otherwise suitably implemented. In some variants, one or barriers can be integrated into the frame and/or the frame can serve as a barrier; however, the set of barriers can alternatively be separate from the frame and/or can be otherwise suitably implemented. Barriers and/or components thereof (e.g., opto-electronic sensors) can be mounted externally (e.g., enclosing the frame), mounted internally (e.g., within an area footprint of the frame), hung/clipped to the frame, supported against the frame, abutted against the frame, and/or otherwise minimally expand the area footprint of the system.

The barriers preferably circumferentially envelop the robotic assembly system and/or robot arm (e.g., in one or more planar cross-sections, in a horizontal cross section, with gaps less than a predetermined threshold, such as 6 millimeters) which may shield the system workspace. Additionally or alternatively, in some variants, portions of the robotic assembly system may be unenclosed (unshielded) by the barriers.

Figure 5:
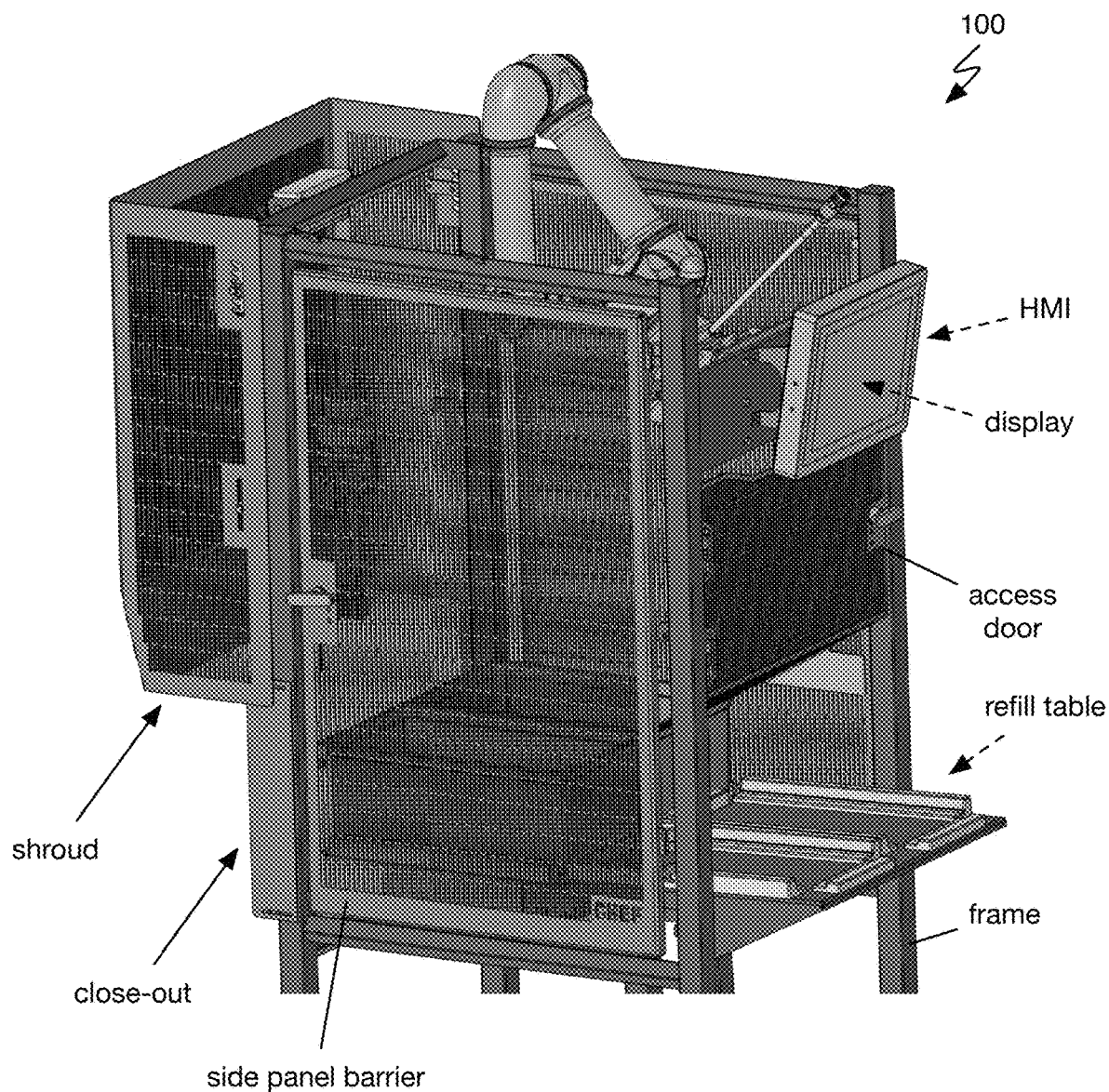
FIG. 5 is a partial 3D view of a variant of the system.

In a first set of variants, the top of the robotic assembly system may be unenclosed, which may allow articulation of the robot arm and/or joints thereof above the barriers (e.g., at a height of about 2 meters, about 1 meter above a standard worksurface height; where incidental ingress may be unlikely and/or acceptable; an example is shown in FIG. 5). As an example, such variants may allow the robotic assembly system to fit under (and/or roll through) a standard door frame, while enabling a maximum joint height to exceed the height of a standard door frame. For example, an exposed/unguarded boundary of the workspace can include a superior region (e.g., uppermost extent of the workspace, etc.), wherein at least one joint of the robot arm is configured to transform above a maximum height of the frame and/or the set of machine guards. However, the top and/or upper ends of the system can alternatively be covered, enclosed, and/or shielded by one or more barriers of the set, and/or the system may have any other suitable height or height constraints.

Figure 12:
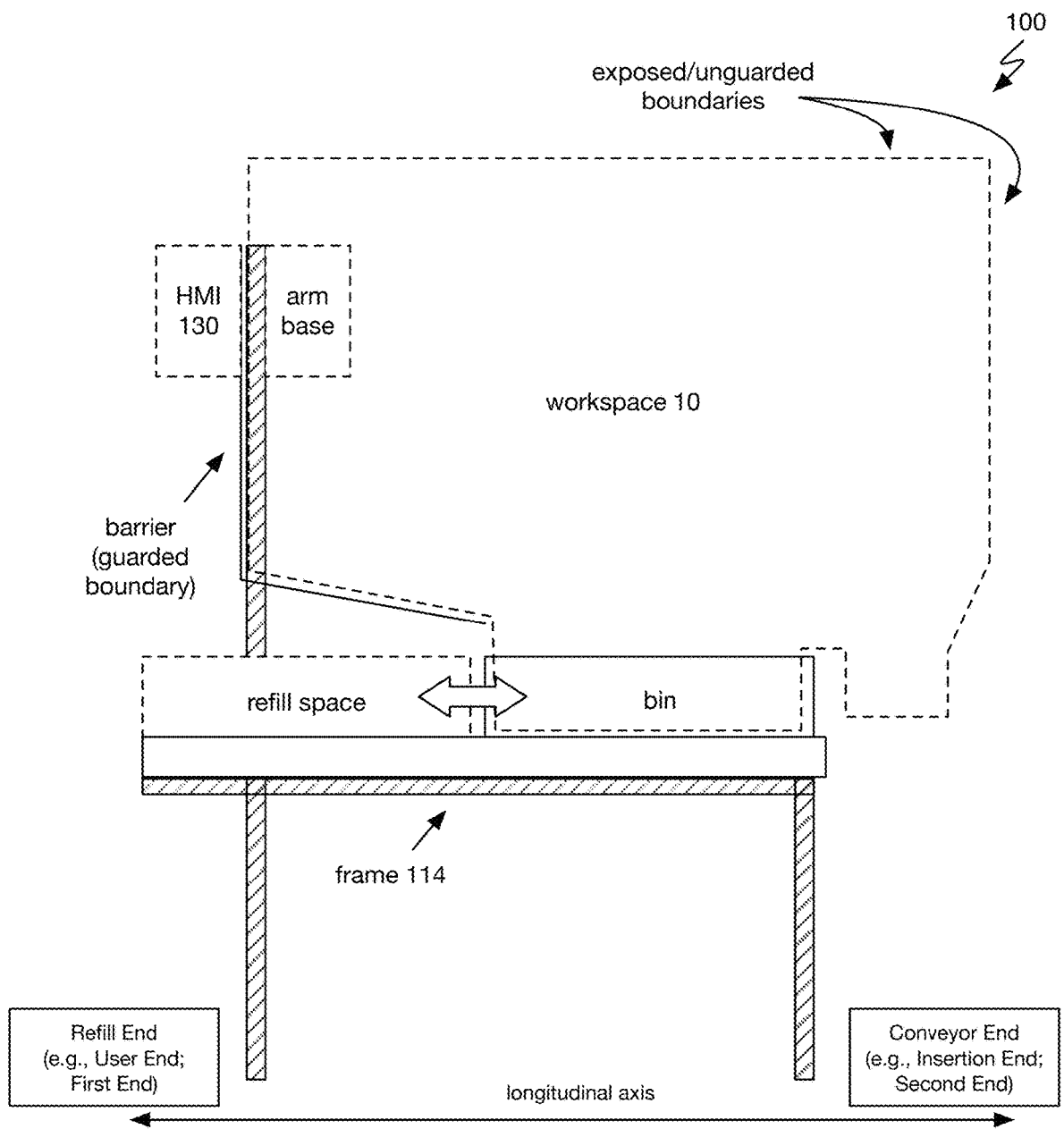
FIG. 12 is a side view schematic of a variant of the system with exposed/unguarded workspace boundaries.
Figure 13:
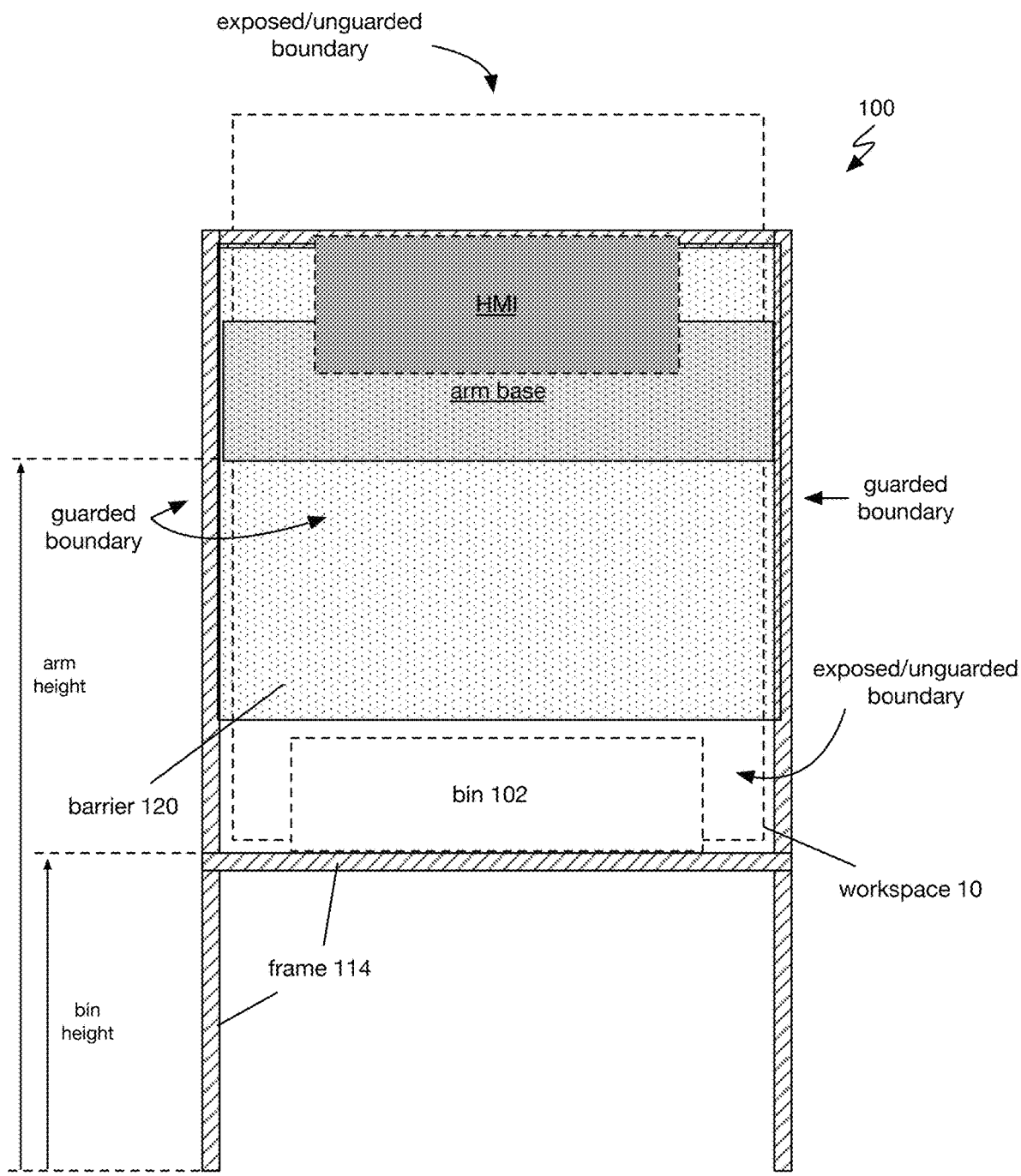
FIG. 13 is a front view schematic of a variant of the system with exposed/unguarded workspace boundaries.

In a second set of variants (e.g., an example is shown in FIG. 12, a second example is shown in FIG. 13), nonexclusive with the first, the set of barriers can facilitate external ingress of the workspace (e.g., at a refill region) concurrently with operation of the collaborative robot arm. For example, the arrangement of the barriers (e.g., and/or unguarded/exposed regions of the workspace) and/or barrier geometry may allow bins and ingredients to be manually transitioned into and/or out of the workspace contemporaneously with operation/motion of the robot arm. In a second example, the set of barriers and the frame cooperatively define a refill region at a refill end of the assembly (e.g., opposite the conveyor line and/or conveyor region), the refill region between the left and right barriers, wherein the workspace is unenclosed at the refill region. For instance, the barriers and/or frame can cooperatively define an exposed/unguarded boundary of the workspace between a refill table and the HMI. As a second example, the barriers and/or frame can cooperatively define an exposed/unguarded boundary of the workspace between a bin height (e.g., of the refill table and/or base structure of the frame) and an arm height (e.g., at a base/mount of the robot arm, such as at a base joint of the robot arm).

Figure 14A:
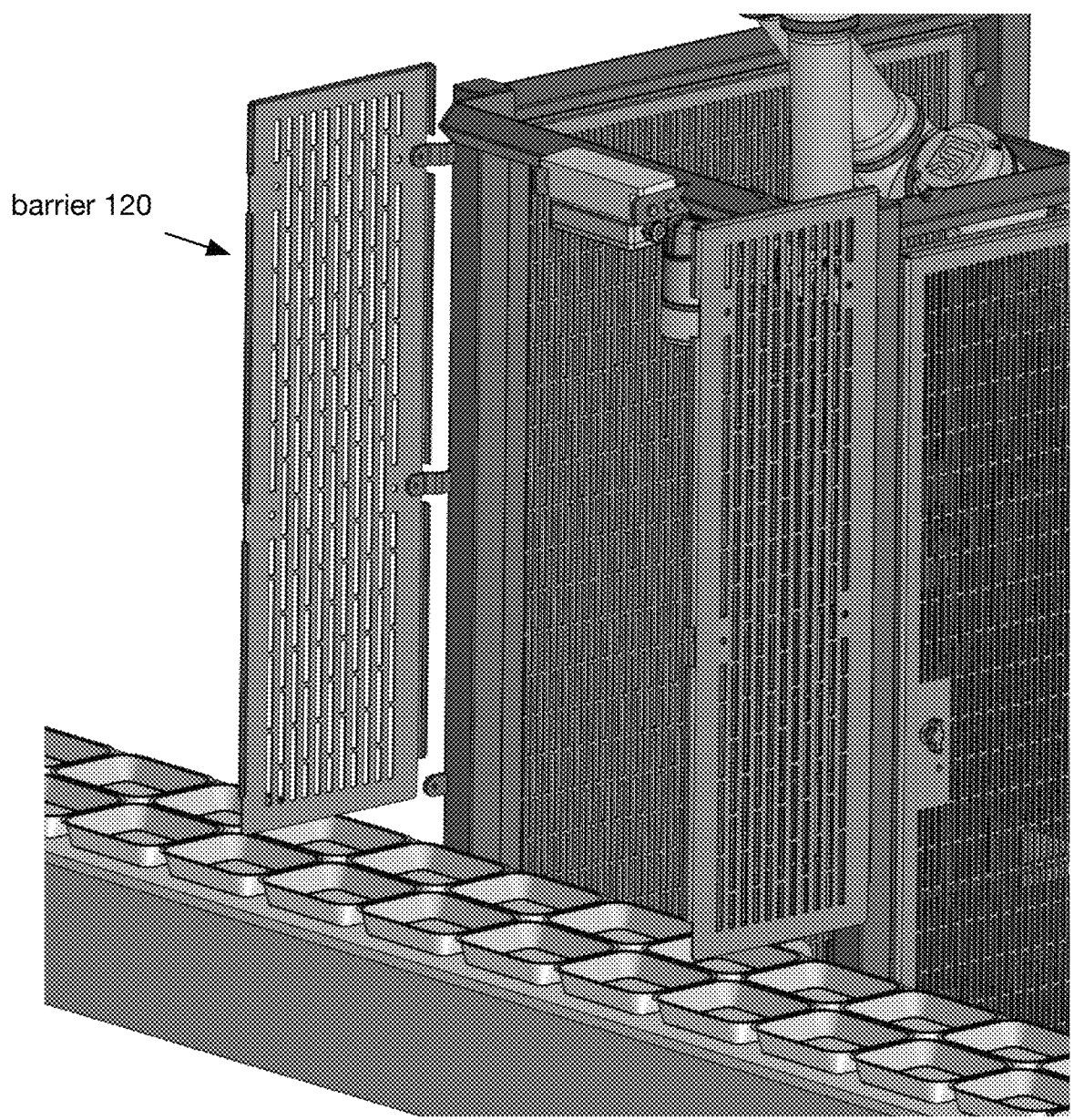
FIG. 14A is a partial 3D view of a variant of the system.
Figure 14B:
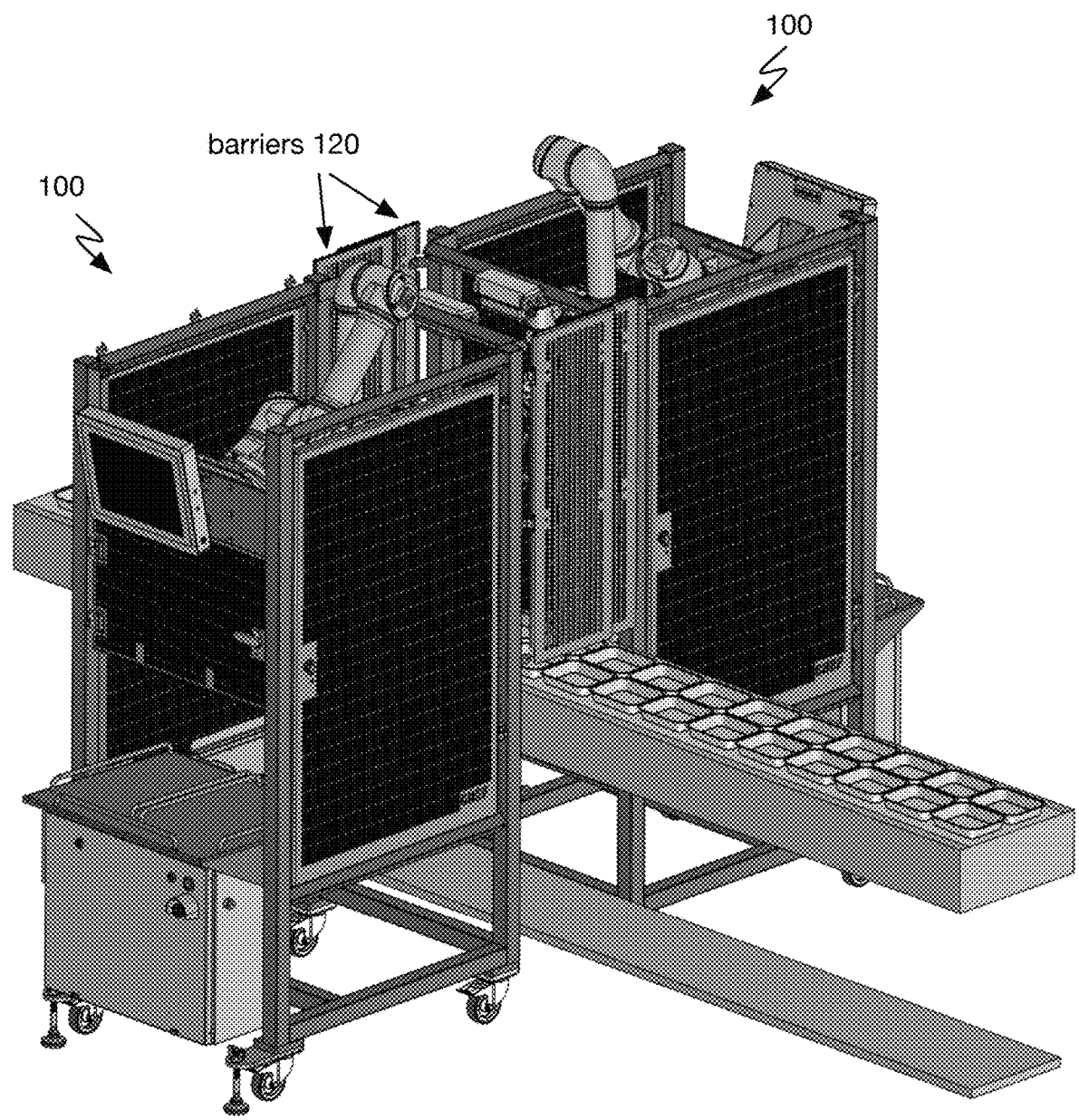
FIG. 14B is an 3D view of an example configuration with a pair of foodstuff assembly systems on opposite sides of a conveyor line in one or more variants of the system.
Figure 15:
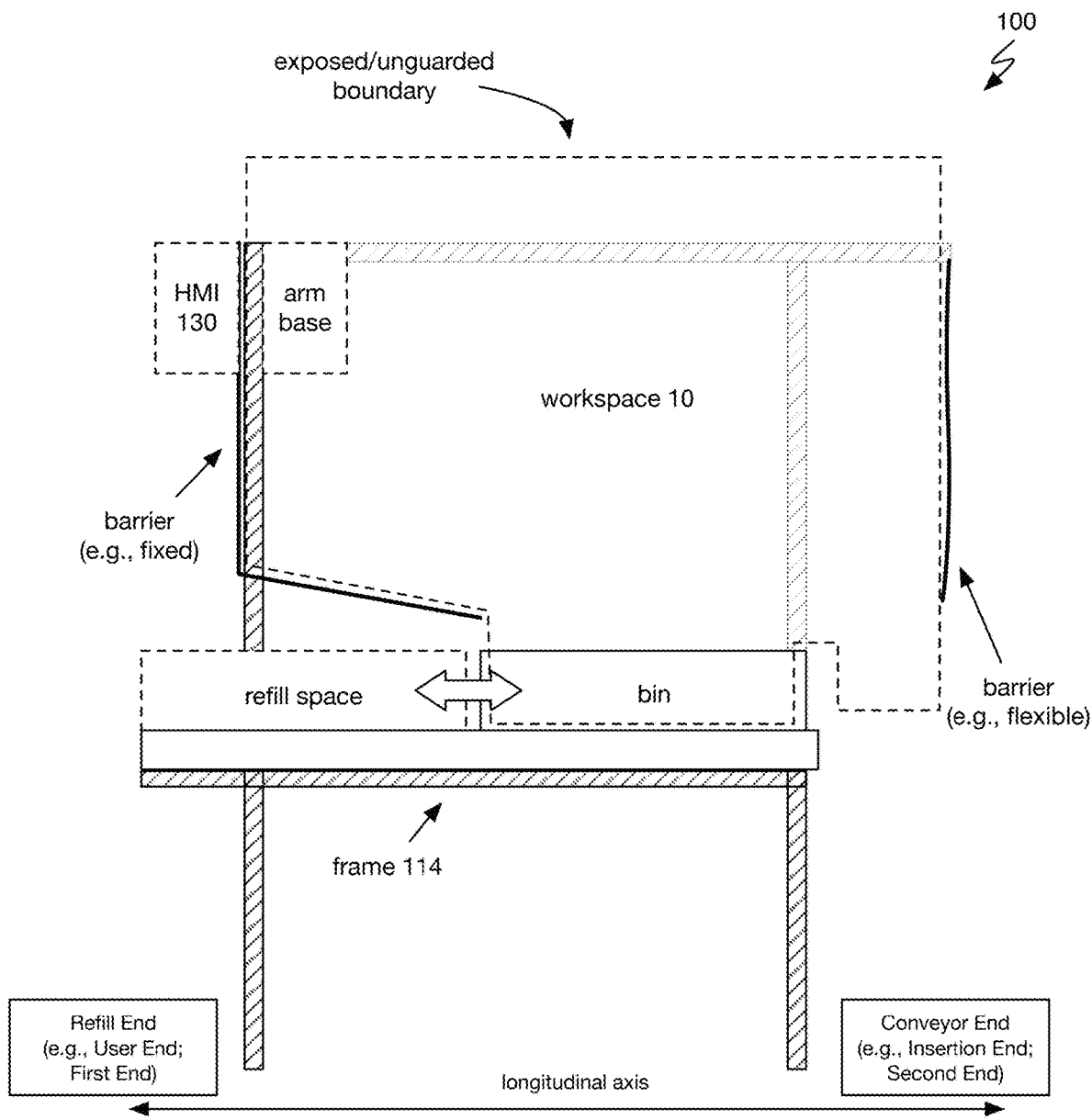
FIG. 15 is a side view schematic of a variant of the system with a flexible barrier.
Figure 16:
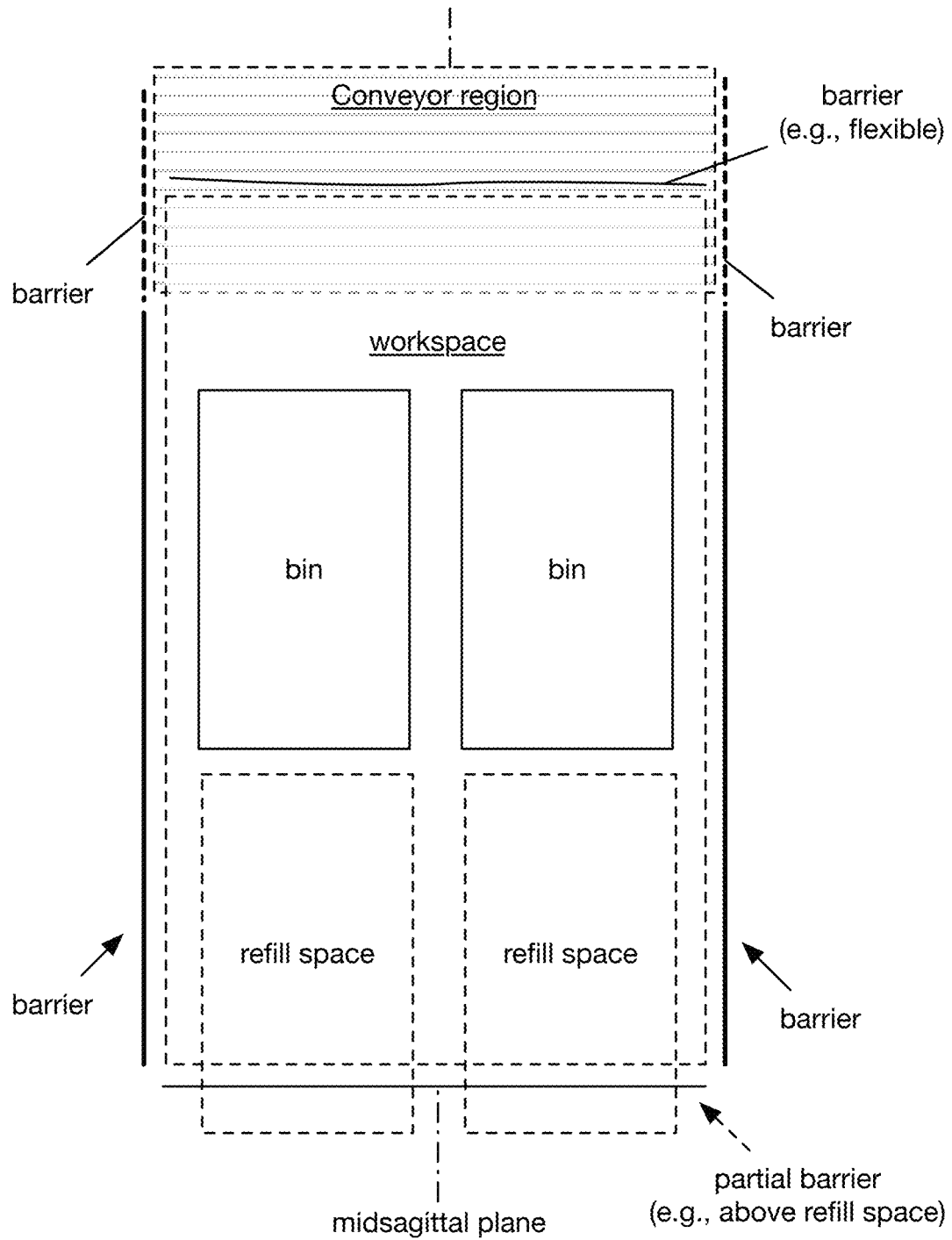
FIG. 16 is a top view schematic of a variant of the system.

In a third set of variants, the workspace can be at least partially unenclosed at a conveyor end of the system (e.g., a first example is shown in FIG. 12; a second example is shown in FIG. 14A). For example, the system can be configured without a shroud and/or barrier at a conveyor end (e.g., at a conveyor end of the system; above the conveyor; a portion of the workspace above the conveyor, etc.). In such variants, the robot arm is configured to extend the food utensil (and/or at least one joint of the robot arm) longitudinally beyond the frame and the set of barriers. Additionally or alternatively, the portion of the workspace above the conveyor can be at least partially guarded with flexible barriers (e.g., examples are shown in FIGS. 15, 16, 17A-17B), adjustable barriers, side barriers (e.g., examples are shown in FIGS. 14A-14B and FIG. 16).

In a fourth set of variants, a pair of foodstuff assembly modules (on opposing sides of the conveyor) can cooperatively shield the conveyor region (e.g., restricting side ingress, except for containers). For example, the frames and/or barriers of a pair of foodstuff assembly modules can cooperatively define an enclosure which encircles the workspaces of both foodstuff assembly modules (e.g., across a range of heights; in at least one least one plane which is parallel to the ground and/or orthogonal to a gravity vector; etc.).

However, the set of barriers can include any other suitable exposed boundaries and/or provide guarding of any other suitable portions of the workspace and/or workspace boundaries.

In variants (e.g., an example is shown in FIG. 5), the set of barriers 120 can include: a set of side panels, an access door, a shroud, a set of closeouts, and/or any other suitable components.

The barriers can include a set of side panels which functions to limit side ingress into the system workspace (e.g., from a left, right, front, and/or rear sides; substantially parallel to a motion of the conveyor; along a broad side of the workspace; etc.). Side panels can be mounted to the frame: removably (e.g., to facilitate remote cleaning, which can facilitate system serviceability), fixedly (e.g., with mounting hardware/fasteners), rotatably (e.g., with a hinge and latch; detachable hinges or lift-off hinges with a lock), and/or otherwise suitably mounted. In a first example, the side panels can be removable side doors connected with a detachable (e.g., lift off) hinge, and retained via a door latch (e.g., released with a rotatable knob or door handle, hygienic handle, etc.). In a second example, the side panels can be (vertically) sliding panels (e.g., slide up and down between a pair of vertical slots, maybe retained in a raised position with a pin/latch, etc.; flat, curved, etc.). The side panels are preferably planar and/or rectangular (e.g., for a rectangular/prismatic frame, but can have any other suitable geometry. The side panels preferably extend between a base of the workspace and/or based support structure (under the bin) and an upper end of the robotic assembly system (e.g., top of the frame); however, the side panels can alternatively be offset from the frame (e.g., to facilitate hinged rotation, etc.; defining a gap of less than a threshold distance, such as 6 millimeters, etc.), extend beyond the frame (e.g., project over a conveyor, an example is shown in FIG. 14A).

However, the barriers can include any other suitable side panels. Alternatively, the side panels can be integrated into the structure of the frame, extend beyond the frame structure (e.g., above the conveyor; examples are shown in FIGS. 14A and 14B), or can be omitted entirely (e.g., in one or more configurations).

Figure 2A:
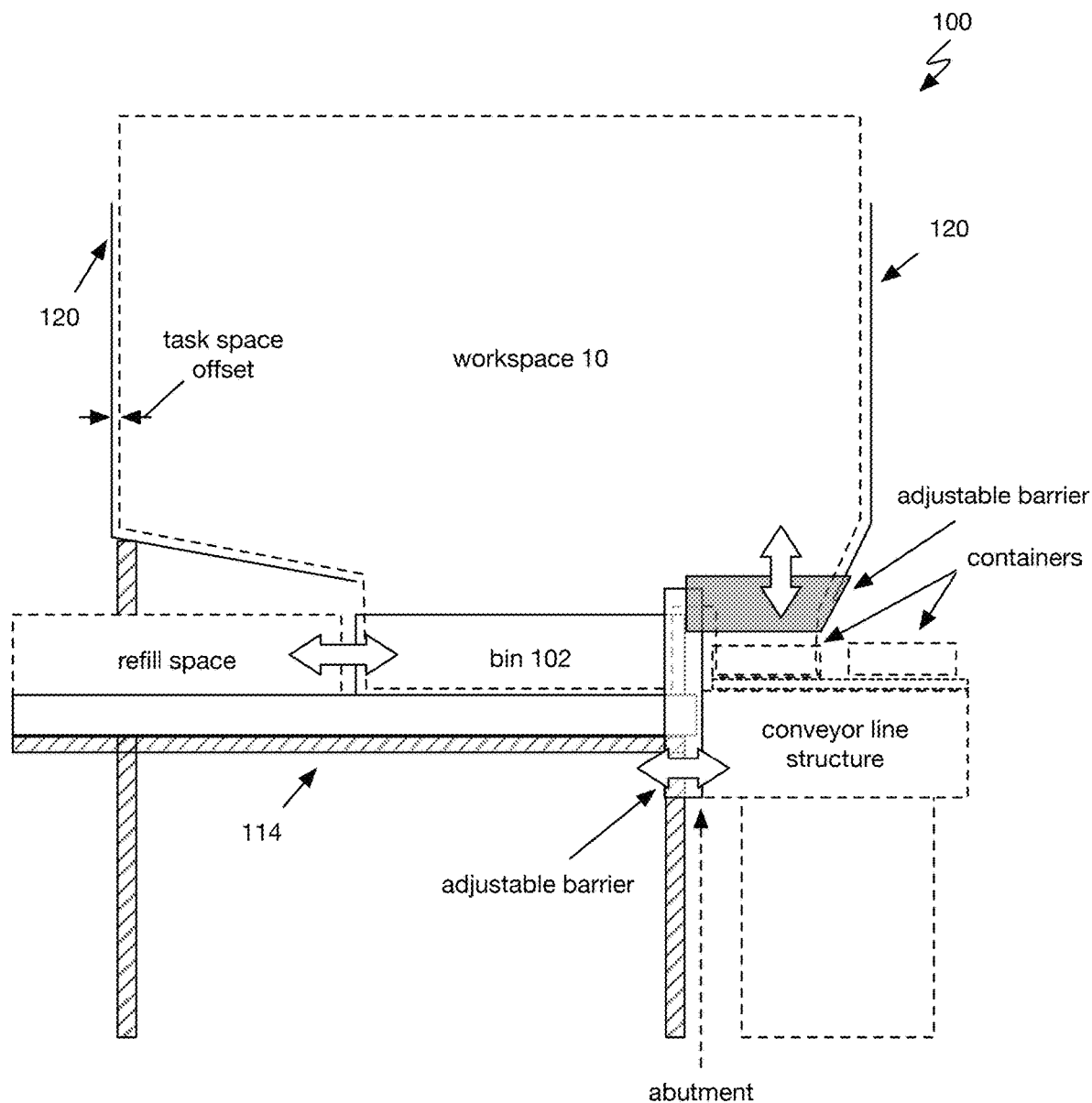
FIG. 2A is a schematic representation of a variant of the system.
Figure 2B:
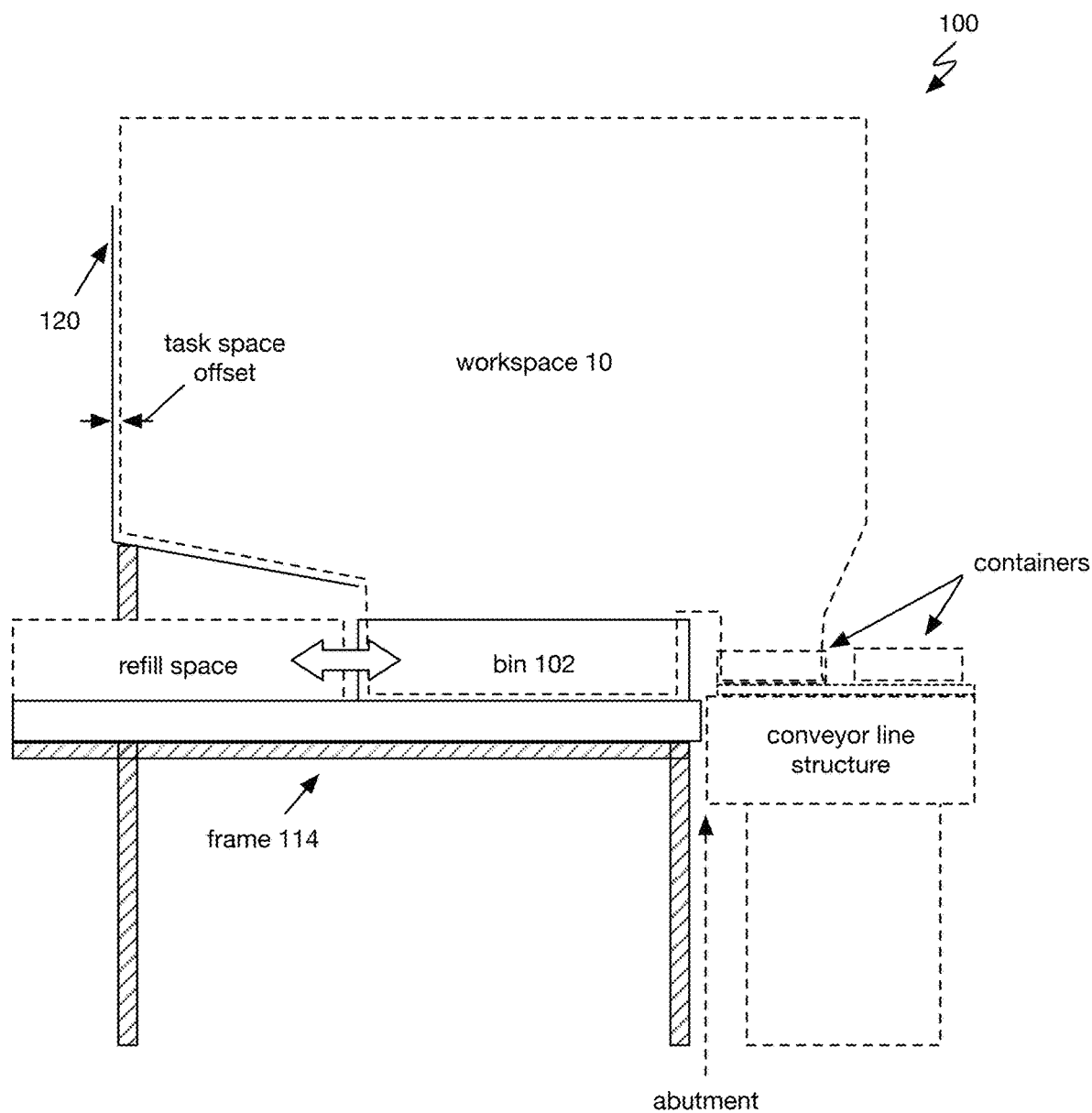
FIG. 2B is a schematic representation of a variant of the system.
Figure 3A:
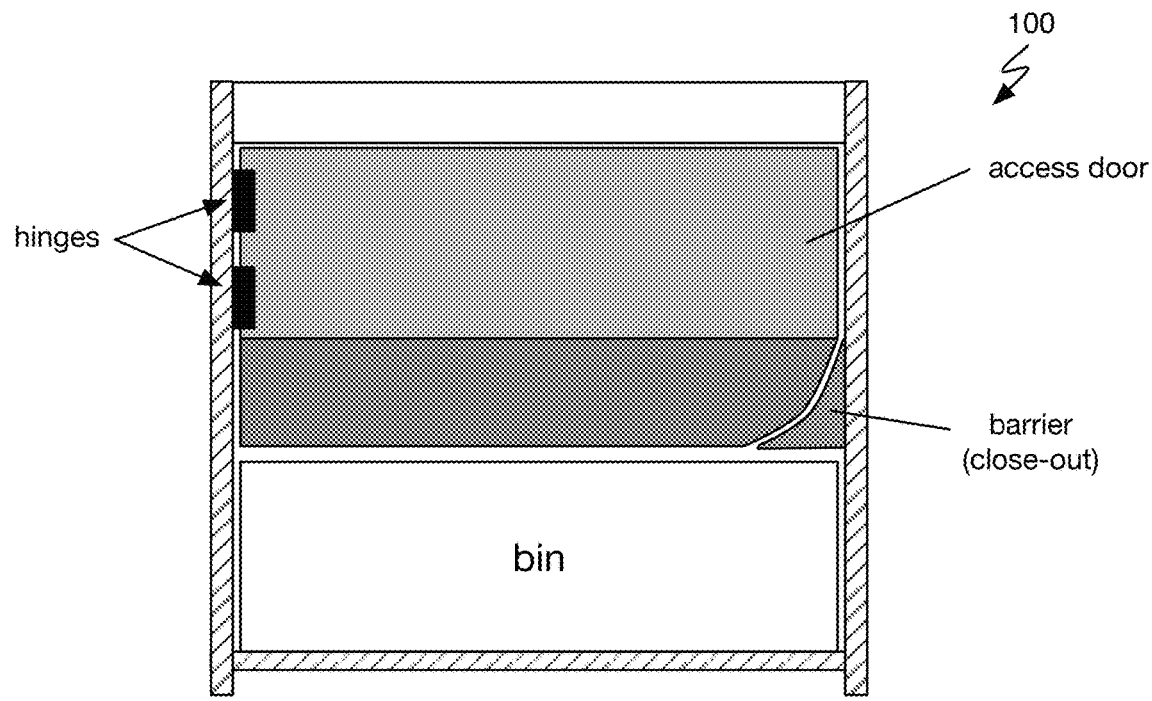
FIG. 3A-B are a first and second schematic representation of a variant of the system, respectively.
Figure 3B:
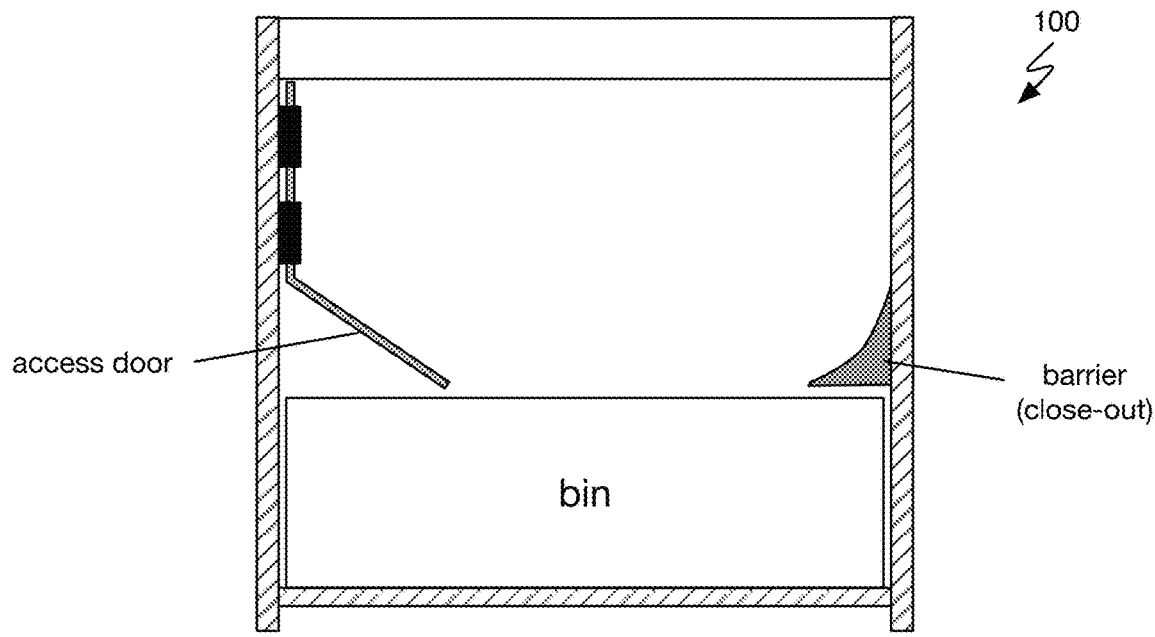

In some variants, the barriers can optionally include an access door which functions to facilitate access to the bin and/or utensil (e.g., from a side of the robotic assembly system opposite a conveyor; rear access door; ingredient refill end access; in one or more configurations). Additionally or alternatively, the access door can limit rear ingress into the system workspace (e.g., when closed, etc.). The access door can be mounted to the frame: removably (e.g., to facilitate remote cleaning, which can facilitate system serviceability), fixedly (e.g., with mounting hardware/fasteners), rotatably (e.g., with a hinge and latch; detachable hinges or lift-off hinges with a lock), and/or otherwise suitably mounted. In a first example, the access door can be connected to the frame with a detachable (e.g., lift off) hinge, and retained via a door latch (e.g., released with a rotatable knob or door handle, hygienic handle, etc.). In variants, a lower portion of the access door (e.g., below the set of hinges) can be curved or angled to facilitate removal of the bin(s) (e.g., out of an operating configuration) and/or transformation of the bins into a refill space (e.g., with the door closed; an example is shown in FIG. 3A). For example, a lower portion of the access door can terminate proximal to an upper lip of a bin (e.g., within 6 mm, within 20 mm, etc.), which may allow an operator to reach the lip of the bin without entering the workspace of the assembly system (e.g., an example is shown in FIG. 2). In one example, the door can be arranged below the HMI and removably coupled to the frame (e.g., at an upper portion of the door), a lower portion of the access door angled towards the conveyor line (e.g., inward relative to the interior of module/workspace). Alternatively, the access door can be substantially planar, or can be otherwise configured (e.g., a rear side panel, etc.).

Figure 8:
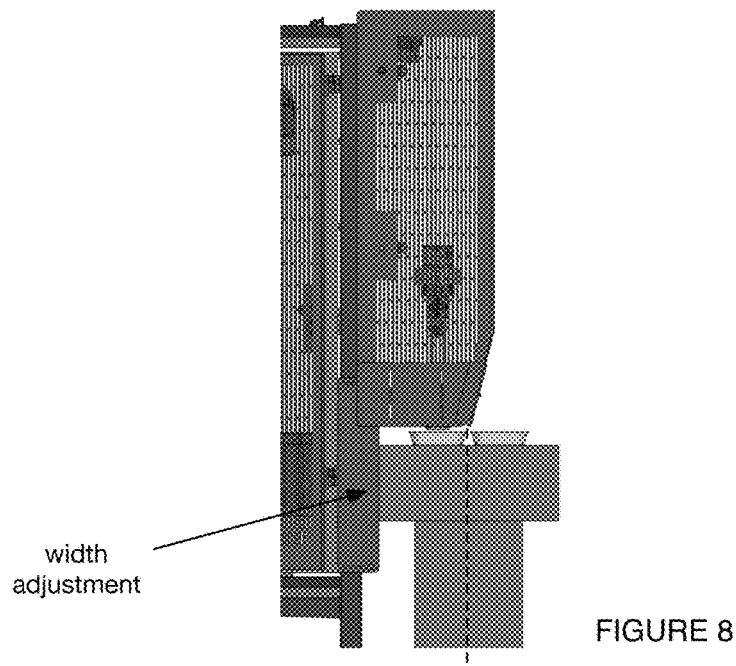
FIG. 8 is a partial side view of a variant of the system.
Figure 11A:
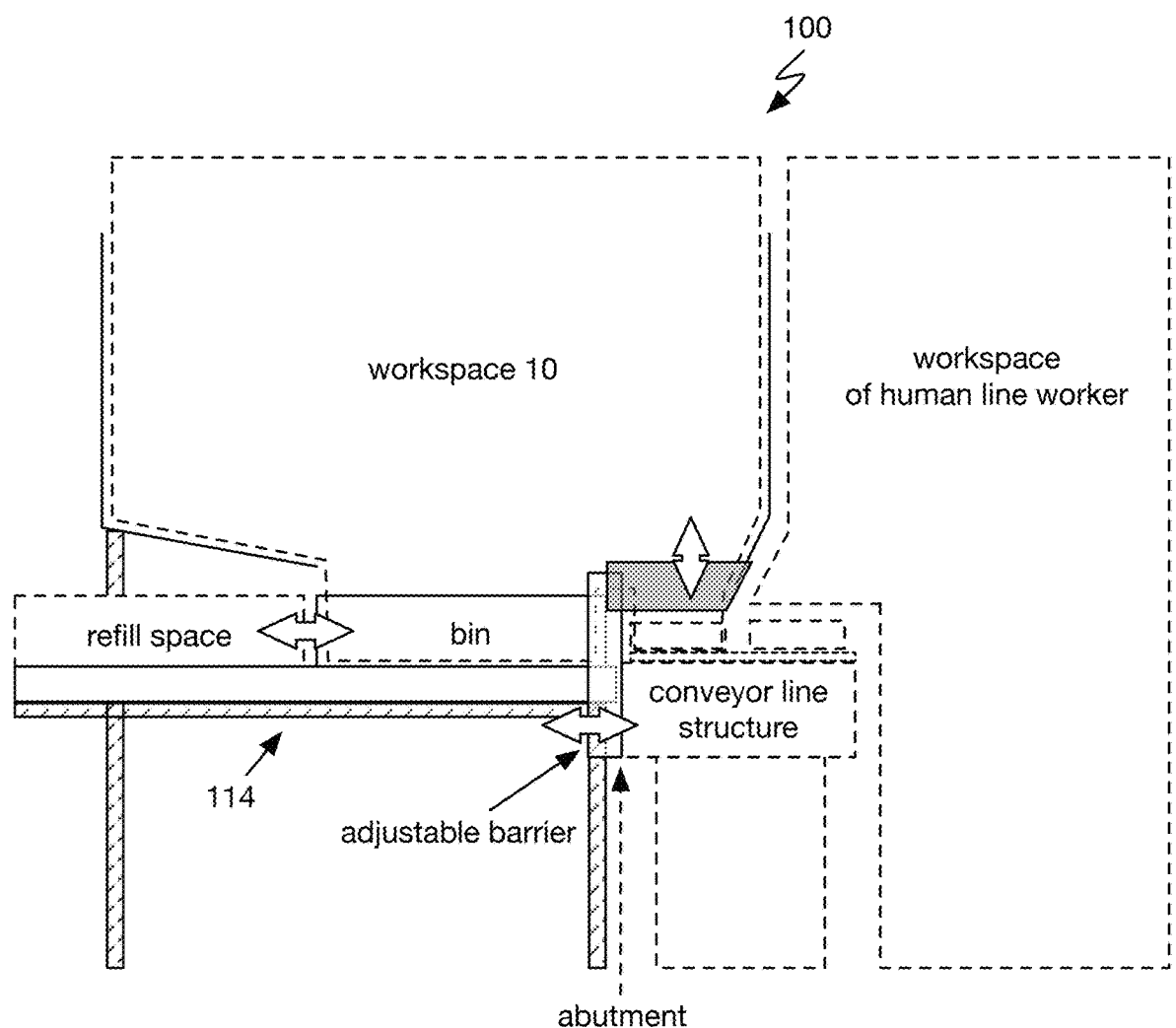
FIG. 11A is a side view schematic of a configuration with a human assembly line worker opposite the foodstuff assembly system across the conveyor line in one or more variants of the system.
Figure 11B:
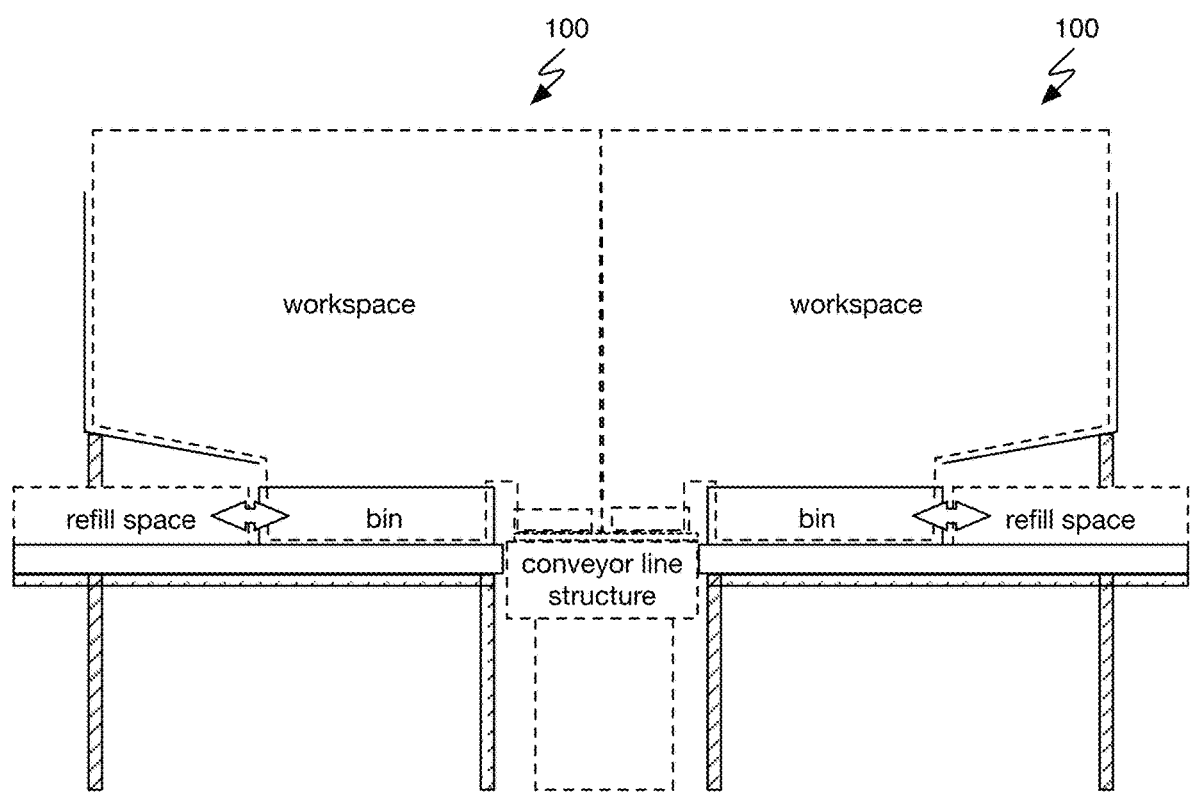
FIG. 11B is a side view schematic of a configuration with a pair of foodstuff assembly systems on opposite sides of a conveyor line in one or more variants of the system.

The barriers can include a shroud which functions to shield the robot arm and/or utensil during item/ingredient placement (e.g., into containers on the conveyor line). The shroud can be unitary (e.g., a single bent sheet metal part, a single weldment, vinyl curtain, etc.) or an assembly of multiple sub-elements. The shroud preferably extends above the conveyor line, shielding the robot arm in a placement configuration. The shroud preferably protrudes over the conveyor line by at least a maximum width of a container (e.g., for variable container sizes). For example, a vertical projection of the shroud can protrude: 15 cm, 25 cm, 30 cm 35 cm, 40 cm, 50 cm, greater than 50 cm, and/or any other suitable distance over the conveyor (e.g., in a width dimension) and/or forward of an abutment surface of the robotic assembly system (e.g., which can be arranged in contact with the conveyor). In variants, a lower portion of the shroud can be tapered or angled rearward (e.g., for a vertically downward vector), reducing the protrusion over the conveyor proximal a lower end of the shroud (e.g., an example is shown in FIG. 2A; a second example is shown in FIG. 8). For example, in some configurations, a human worker may place ingredients into bowls on an opposing side of the conveyor line. In such circumstances, tapering/angling a bottom section of the shroud away from the human worker may make it easier for the human to access containers on the opposite side of the conveyor line (e.g., an example is shown in FIG. 11A). Alternatively, the shroud can be remove/ omitted (e.g., an example is shown in FIG. 2B), which can facilitate operation of foodstuff assembly modules on opposing sides of the conveyor (e.g., an example is shown in FIG. 11B; a second example is shown in FIG. 14B).

In one example, a left and right sides of the shroud can be substantially planar (e.g., in line with left and/or right side panels of the barrier). The front can be flat (or include two flat sections), curved/arcuate, and/or can have any other suitable geometry.

The shroud can define a shroud height (e.g., relative to the frame, and/or base of the system 100; relative to feet/wheels) at a lower end of the shroud (e.g., above the conveyor line). The shroud height can be fixed or adjustable. In one set of variants, the shroud height can be mounted at a predetermined fixed height relative to the frame. In a second set of variants, the shroud height can be adjusted by raising or lowering the frame using a set of adjustable (e.g., leveling) feet. In a third set of variants, the shroud can be mounted at an adjustable height relative to the frame (e.g., variably mounted along a set of vertical slots; multiple mounting positions at different heights, etc.). However, the shroud can be otherwise suitably mounted.

In a first illustrative example, the shroud height can be adjusted to clear the max height of a set of containers along a conveyor height (e.g., wherein a skirt at a base of the shroud can be adjusted to accommodate variable conveyor line poses; provide pitch/roll adjustments; and/or provide more granular height adjustments; etc.).

In a second illustrative example, the shroud can include a vinyl curtain arranged above the conveyor (e.g., clipped to the frame, etc.). The frame and/or mounting structure can additionally include a backing structure, in line with the camera, to restrict the curtain from swinging in front of frame-mounted sensors (e.g., camera oriented towards the conveyor) and obstructing the sensor field of view. An example is shown in FIGS. 17A and 17B.

The barriers can include an optional set of close-outs which function to reduce gap sizes between the barrier(s), the frame, the bin(s), and/or an adjacent conveyor line. The close-outs can be static (e.g., fixed relative to the frame) or adjustable. The close-outs can be of the same material construction as other barrier components (e.g., perforated sheet metal, such as stainless steel) or can be of a different material construction.

In variants, the set of barriers can include an adjustable close-out between the conveyor structure and the frame/bin, which can allow the system to be adjusted for different conveyors (e.g., with different widths). For example, a movable closeout can adjust along a front edge of the frame (e.g., proximal to the conveyor structure) and may slide laterally (e.g., forward and rearward), such as along a set of slotted mounts. As an example an adjustable barrier can be adjusted and/or reconfigured to abut a side surface of a conveyor line structure (e.g., an example is shown in FIG. 2; a second example is shown in FIG. 8), which can reduce a side gap between adjacent to the conveyor.

In variants, the close-outs can include an optional shroud skirt which functions to reduce a gap between the shroud and the conveyor line. The shroud skirt can mount to the frame, the shroud, an adjustable barrier (e.g., such as an adjustable closeout between the conveyor structure and the frame), and/or any other suitable components. The shroud skirt can be a unitary component or can include a plurality of separate elements (e.g., three elements; left, right, front sections; which can be independently and/or collectively adjusted). The shroud skirt is preferably vertically adjustable (e.g., at multiple sections) and/or tiltable (e.g., pitch and/or roll axes), but can additionally translate horizontally (e.g., when mounted to a laterally-translatable closeout, etc.) and/or otherwise adjustable relative to the frame. In a first example, a height of a left and right side (e.g., narrow ends) of the shroud skirt can be separately adjusted, which can allow the skirt to account for height changes along an inclined/pitched conveyor (e.g., relative to the frame). In a second example, the shroud skirt can be angled (tilted forward/rearward) to accommodate inclined floor surfaces and/or a net roll angle (s) of the conveyor relative to the frame. In a third example, the shroud skirt can be adjusted vertically to adjust a height relative to the conveyor (e.g., achieve a desired clearance above the containers, such as 5 mm, 6 mm, 10 mm, etc.). For instance, the shroud and/or shroud skirt adjustments can account for various container (e.g., bowl) heights and/or can allow the shroud to be raised/lowered based on the desired ingredient placement to prevent "bowl jamming" in cases where foodstuff may protrude from the top of the container (e.g., disadvantageously jamming foodstuff against the shroud/skirt, which may prevent the bowl from entering the workspace).

Figure 4:
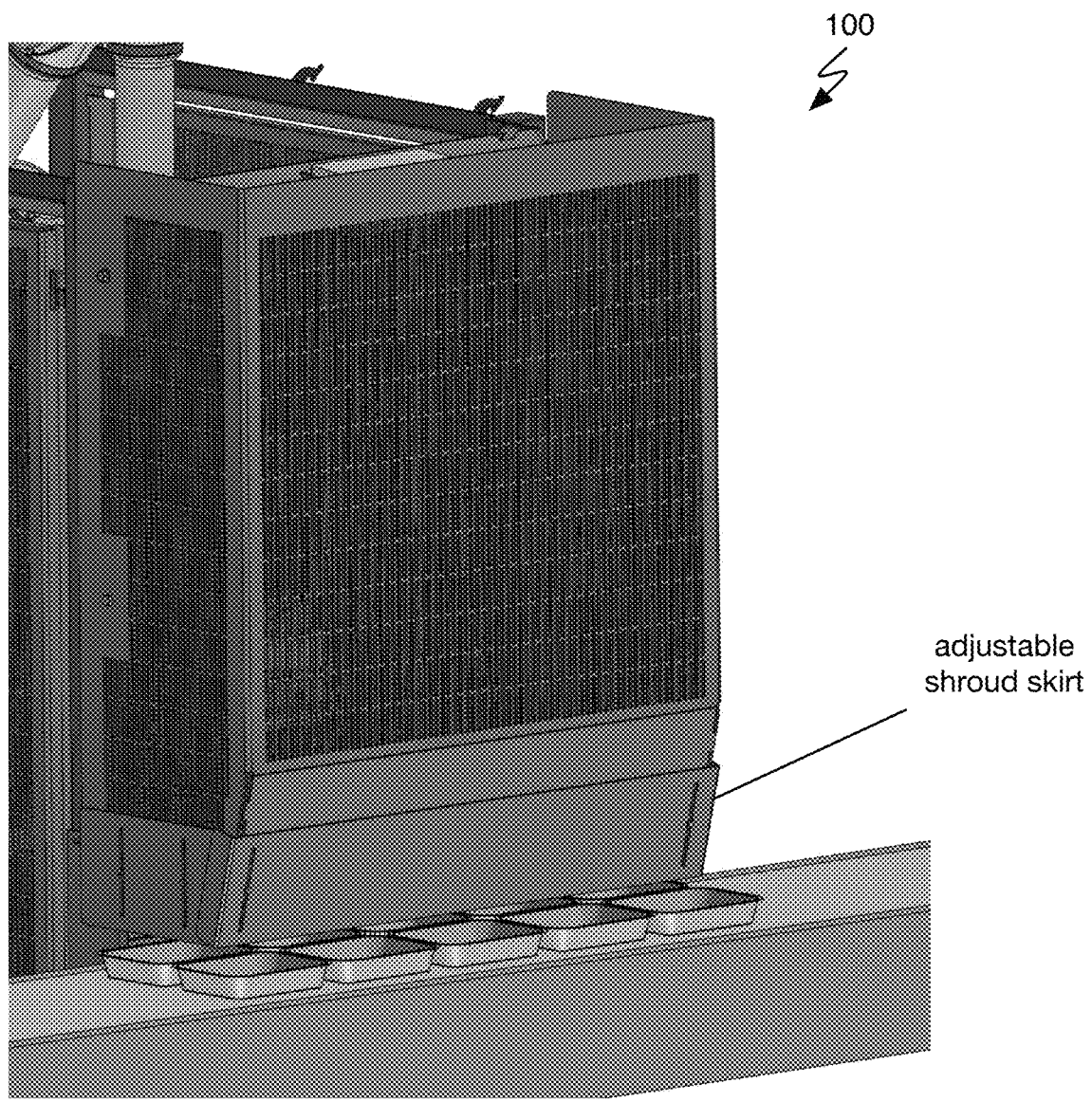
FIG. 4 is a partial 3D view of a variant of the system.

As an example, the skirt can include a set of parallel (e.g., vertical) slots along each side of the shroud, which can allow independent vertical adjustment of the left and right sides (an example is shown in FIG. 4).

Figures 6, 7:
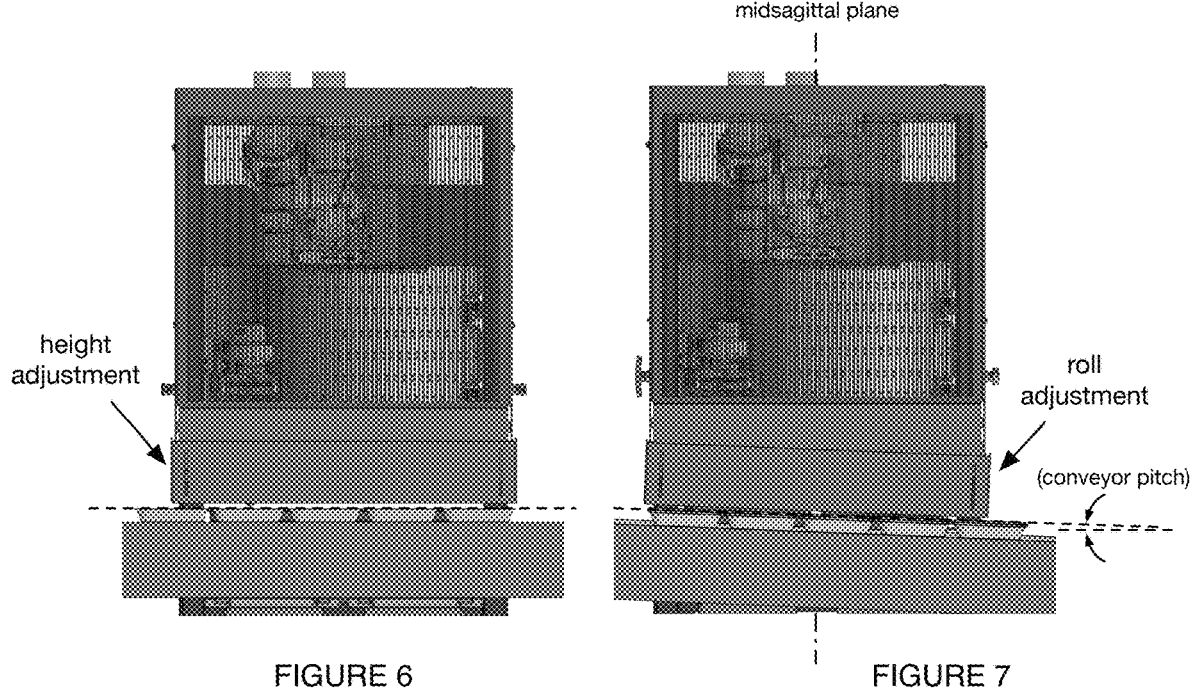
FIG. 6 is a partial front view of a variant of the system.
FIG. 7 is a partial front view of a variant of the system.

In an illustrative example, even in cases where a conveyor is flat, industrial floors can be sloped 3 inches or more in each horizontal axis. In such cases, an adjustable close-out can be used set and/or occupy a spacing between the frame and the conveyor, such that the shroud protrudes to about a midline of the conveyor (e.g., providing placement access to containers and/or providing a human worker access to containers on an opposing side of the conveyor) and/or overlaps a target section of the conveyor. Once this spacing is set, the system can be repositioned along the conveyor line with minimal/no adjustment to the adjustable close-out. The barrier skirt (and/or individual elements thereof) can then be adjusted to accommodate variance relative height, pitch, and/or roll changes at various positions along the conveyor. For example, a shroud can be pitch-adjustable and/or roll adjustable relative to a longitudinal axis of the robotic assembly (e.g., an example is shown in FIG. 12; along a midsagittal plane of the assembly, such as shown in FIG. 7), which may accommodate various conveyor inclination(s) (e.g., examples are shown in FIG. 6 and FIG. 7).

Figure 9:
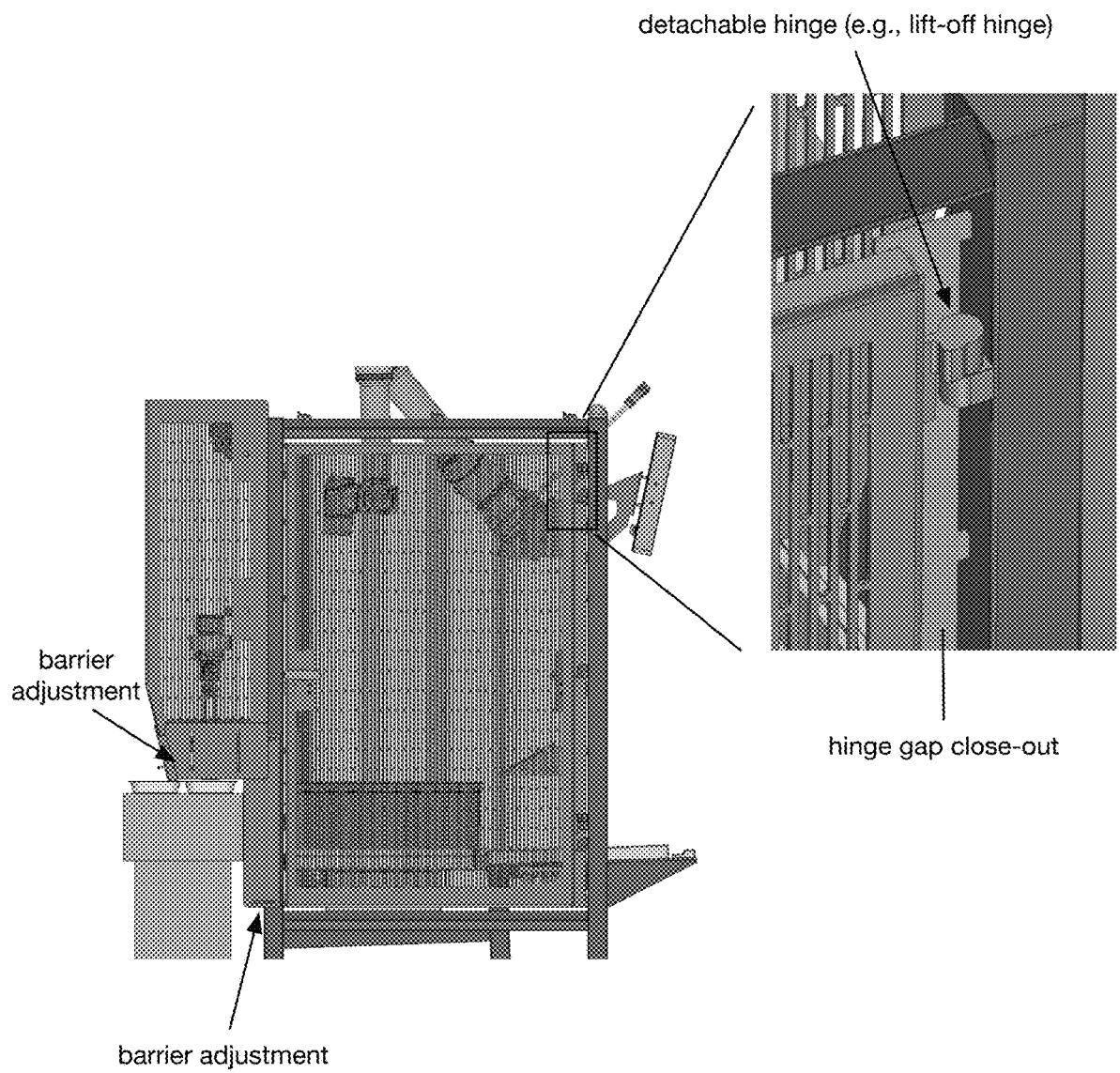
FIG. 9 is a side view of a variant of the system with a 3D detailed view of a close-out.

In variants, the set of barriers can optionally include a hinge gap close-out, which functions to fill a gap along a hinge of a side panel (e.g., an example is shown in FIG. 9) or (rear) access door.

Figure 10A:
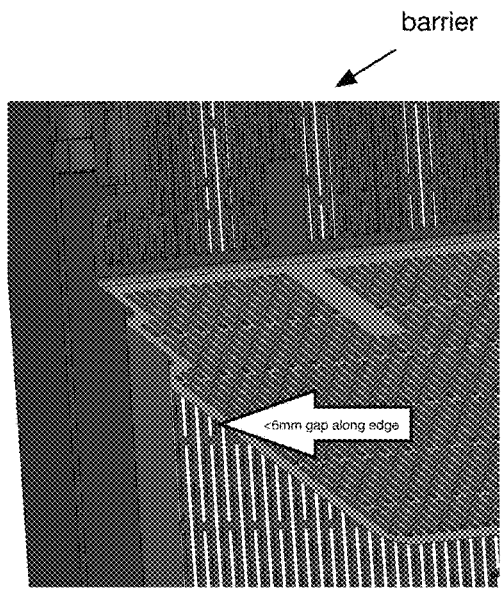
FIGS. 10A-D are partial 3D views of a barrier in one or more variants of the system.
Figure 10B:
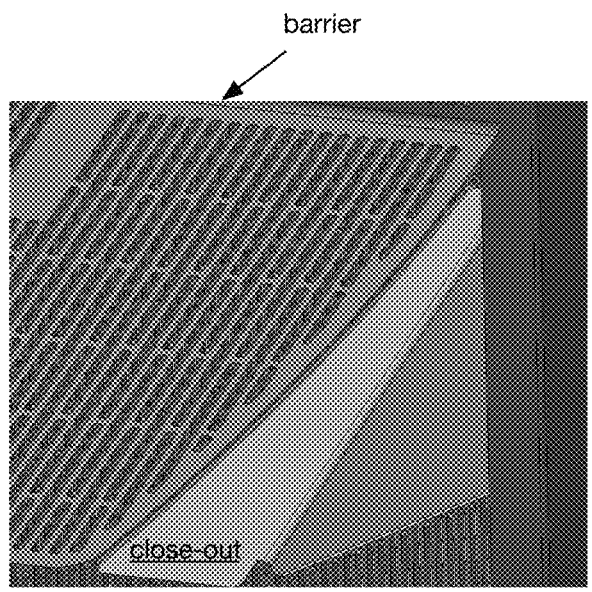
Figure 10C:
Figure 10D:
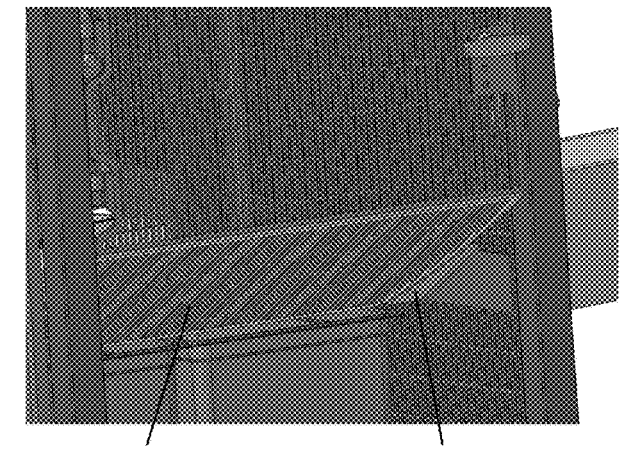

In variants, the set of barriers can include a close-out along the angled section of the angled section of the (rear) access door (e.g., an example is shown in FIGS. 10A-D). In variants, the angled section of the access door can be curved (e.g., arcing towards the hinges) or otherwise shaped to provide relief during rotation about the hinges (e.g., to avoid interference with the frame, an example is shown in FIG. 10B). Accordingly, a close-out can be provided to fill the gap introduced by this relief (e.g., curved closeout, based on the relief geometry of the access door; an example is shown in FIGS. 10B-D). In one example, the set of barriers can include a close-out, mounted to the frame, substantially matching the relief geometry along the lower portion of the door.

In variants, the set of barriers can optionally include a top cover or top closeout which functions to cover the top of the workspace. However, the set of barriers can alternatively exclude a top cover.

In variants, the set of barriers can optionally include a base closeout, which functions to close-out the underside of the workspace. Alternatively, the base closeout can be integrated into the frame structure, or excluded altogether.

In one or more variants, one or more physical barriers (and/or closeouts thereof) can be omitted entirely, replaced with, and/or used in conjunction with an opto-electronic barrier, such as a light curtain, break-beam sensor, and/or other opto-electronic barrier. Additionally or alternatively, one or more barriers can be implemented in conjunction with and/or replaced by a visual indicator of a workspace boundary in one or more configurations. For example, a projected laser light can be used to indicate the workspace boundary when one or more barriers are open/absent (e.g., a side panel/door is open/removed, etc.).

However, the system can include any other suitable set of barriers.

In variants, the workspace can be offset from the set of barriers by a predetermined distance, such as 10 mm, with software-defined arm constraints (e.g., at a controller of the robot arm). Accordingly, the workspace may be at least partially constrained by (or defined by) the geometry of the barriers and/or physical structures of the system (e.g., an example is shown in FIG. 2). Similarly, in one or more configurations, the barriers and/or frame can be offset from the workspace (and/or a joint of the robot arm) by 100 mm, 50 mm, 20 mm, 10 mm, 5 mm, less than 5 mm, any open or closed range bounded by the aforementioned values, and/or any other suitable offset. Likewise, exposed portions of the workspace and/or robot arm (e.g., a joint extending above the frame, boundary of the workspace at the refill region, etc.) can be offset from user can be offset from user-facing components (e.g., HMI, emergency stop, refill table, etc.) by less than: 300 mm, 300 mm, 200 mm, 100 mm, 50 mm, 20 mm, 10 mm, 5 mm, less than 5 mm, any open or closed range bounded by the aforementioned values, and/or any other suitable distance. In such variants, the footprint of the system and/or occupied length of the conveyor line (e.g., area of conveyor region) can be substantially similar to the workspace footprint of a human assembly line worker, allowing the system to operate in place of a human worker (e.g., without sprawling into the workspace of adjacent users in the production facility; allowing partial, reconfigurable, and/or 'as-needed' automation of individual processes in an assembly-line).

In variants, the system can optionally include a set of interlocks, which can be used to trigger a temporary hold, soft stop, or cease control commands when one or more of the barriers is not in place (e.g., when a side panel or access door is open, for example) and/or is broken (e.g., a broken light curtain, an open door, an absent closeout, etc.). Accordingly, removing/opening/breaking a barrier (e.g., to perform a manual tool change, for example) can be used to temporarily halt operation of the robot arm (e.g., while performing a tool change) and/or de-energize actuators of the system (e.g., electrical, pneumatic, hydraulic, mechanical etc.; robot arm, end effectors, etc.). Conversely, applying the barriers can be used to initiate operation/actuation of the system, and/or the system can otherwise receive any other control conditions/commands based on a configuration of one or more of the barriers. As an example, a set of interlock devices can be configured to engage each barrier (e.g., in a default/assembled configuration), wherein the set of interlock devices are configured to prevent operation of the robot arm unless the barriers are arranged in the default configuration. Additionally or alternatively, the robot arm can remain energized during and/or in response to (e.g., for a time period immediately following) an interrupt of an interlock device. For instance, the interlocks can temporarily halt operation, wherein the HMI includes a separate emergency stop and is configured to de-energize the robot arm in response to receipt of a manual input at the emergency stop.

As a second example, a set of interlocks configured to detect an interrupt of at least one of the barriers (e.g., machine guards) and, in response, trigger a halt of the robot arm, wherein the robot arm (and/or controller thereof) is configured to remain in a single operational mode during machine guard interrupts.

However, the system can include or be used in conjunction with any other suitable set of interlocks, and/or can be otherwise configured.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A robotic assembly system configured to facilitate ingredient placement at a placement region along a conveyor line, the robotic assembly system comprising:
   a frame configured to support a set of ingredient bins at a first height;
   a human machine interface (HMI) comprising a display mounted to the frame at a first end opposite the conveyor line along a longitudinal axis of the frame;
   a collaborative robot arm comprising a base, the base mounted to the frame at the first end and at a second height above the first height, the collaborative robot arm defining a workspace; and
   a set of barriers comprising: a left barrier and a right barrier on opposite sides of a midsagittal plane, the left barrier and the right barrier each coupled to the frame with a set of lift-off hinges and substantially spanning between:
      the first height and the second height; and
      the first end and the conveyor line,
   wherein the workspace is at least partially unenclosed below the HMI at the first end, between the left and right barriers.

2. The robotic assembly system of claim 1, wherein the robotic assembly system further comprises: a food utensil mounted at a distal end of the collaborative robot arm, the food utensil configured to facilitate insertion of bulk foodstuff ingredients.

3. The robotic assembly system of claim 2, wherein the set of barriers and the food utensil are selectively removable, by toolless operation, for washdown of the frame.

4. The robotic assembly system of claim 1, wherein the set of barriers and the frame cooperatively define a refill region at the first end, the refill region between the left and right barriers and below the second height, wherein the workspace is unenclosed at the refill region.

5. The robotic assembly system of claim 4, wherein the set of barriers are configured to facilitate external ingress of the workspace at the refill region concurrently with operation of the collaborative robot arm.

6. The robotic assembly system of claim 1, wherein the collaborative robot arm is configured to extend the food utensil longitudinally beyond the frame and the set of barriers.

7. The robotic assembly system of claim 1, wherein at least one joint of the collaborative robot arm is configured to transform above the set of barriers.

8. The robotic assembly system of claim 1, further comprising a set of interlock devices configured to engage each barrier of the set in a default configuration, wherein the set of interlock devices configured to prevent operation of the collaborative robot arm unless the barriers are arranged in the default configuration.

9. The robotic assembly system of claim 8, wherein the collaborative robot arm remains energized during an interrupt of an interlock device of the set of interlock devices, wherein the HMI further comprises an emergency stop, the HMI configured to de-energize the collaborative robot arm in response to receipt of a manual input at the emergency stop.

10. The robotic assembly system of claim 1, wherein the set of barriers further comprises: a door arranged below the HMI and removably coupled to the frame at an upper portion of the door, a lower portion of the door angled towards the conveyor line.

11. The robotic assembly system of claim 10, wherein the door is hinged about an axis of rotation, wherein the door comprises a relief geometry along the lower portion at a distal end relative to the axis of rotation.

12. The robotic assembly system of claim 11, wherein the set of barriers further comprises a close-out, mounted to the frame, substantially matching the relief geometry along the lower portion of the door.

13. The robotic assembly system of claim 1, wherein the set of barriers further comprises a shroud mounted to the frame and arranged above the conveyor line, wherein the shroud is roll-angle adjustable relative to the longitudinal axis.

14. The robotic assembly system of claim 1, wherein each barrier is offset from the workspace by less than 50 millimeters.

* * * * *